United States Patent
Voelkel et al.

(10) Patent No.: US 12,479,254 B2
(45) Date of Patent: Nov. 25, 2025

(54) SELF-CONTAINED AIRSHOCK ASSEMBLY

(71) Applicant: Fox Factory, Inc., Duluth, GA (US)

(72) Inventors: Bret Voelkel, Santa Cruz, CA (US); Nobuhiko Negishi, Santa Cruz, CA (US)

(73) Assignee: Fox Factory, Inc., Duluth, GA (US)

( * ) Notice: Subject to any disclaimer, the term of this patent is extended or adjusted under 35 U.S.C. 154(b) by 854 days.

(21) Appl. No.: 17/518,119

(22) Filed: Nov. 3, 2021

(65) Prior Publication Data
US 2022/0134830 A1    May 5, 2022

Related U.S. Application Data

(60) Provisional application No. 63/109,755, filed on Nov. 4, 2020.

(51) Int. Cl.
*B60G 17/015* (2006.01)
*B60G 17/019* (2006.01)
*B60G 17/08* (2006.01)

(52) U.S. Cl.
CPC ... *B60G 17/0152* (2013.01); *B60G 17/01908* (2013.01); *B60G 17/08* (2013.01); *B60G 2202/24* (2013.01)

(58) Field of Classification Search
CPC .......... B60G 17/0152; B60G 17/01908; B60G 17/08; B60G 2202/24
USPC ............ 188/266.1, 266.2, 266.6, 281, 282.1, 188/282.8, 313–315, 322.2; 267/64.16, 267/64.19–64.28, 64.17; 280/5.515, 280/124.161, 275, 276; 701/37
See application file for complete search history.

(56) References Cited

U.S. PATENT DOCUMENTS

| | | | | |
|---|---|---|---|---|
| 3,770,292 A | * | 11/1973 | Palazzetti | G01P 3/56 280/5.515 |
| 3,836,132 A | * | 9/1974 | McNally | B60G 17/044 267/64.17 |
| 3,986,118 A | | 10/1976 | Madigan | |
| 4,445,673 A | * | 5/1984 | Clark | B62D 33/071 188/315 |
| 4,883,150 A | | 11/1989 | Arai | |
| 5,649,692 A | * | 7/1997 | Gilsdorf | B60G 11/26 267/64.22 |
| 5,952,823 A | | 9/1999 | Sprecher et al. | |

(Continued)

FOREIGN PATENT DOCUMENTS

| | | |
|---|---|---|
| DE | 102015006597 A1 | 12/2015 |
| EP | 3436293 A1 | 2/2019 |

(Continued)

OTHER PUBLICATIONS

European Search Report for European Application No. 21206534.6, 8 Pages, Apr. 8, 2022.

*Primary Examiner* — Christopher P Schwartz

(57) ABSTRACT

An airshock assembly is disclosed. The airshock assembly includes a shock absorber an airspring, and an air compressor assembly. The airspring is axially coupled with a portion of the shock absorber and used to modify a ride height of the shock absorber. The air compressor assembly is coupled with a portion of the shock absorber. The air compressor assembly is used to modify an air pressure in the airspring without requiring the airshock assembly to utilize an air reservoir.

22 Claims, 12 Drawing Sheets

(56) References Cited

U.S. PATENT DOCUMENTS

| | | | |
|---|---|---|---|
| 7,959,135 B2* | 6/2011 | Voelkel | F16F 9/05 |
| | | | 267/64.21 |
| 8,627,932 B2 | 1/2014 | Marking | |
| 8,838,335 B2 | 9/2014 | Bass et al. | |
| 8,857,580 B2 | 10/2014 | Marking | |
| 9,033,122 B2 | 5/2015 | Ericksen et al. | |
| 9,120,362 B2 | 9/2015 | Marking | |
| 9,239,090 B2 | 1/2016 | Marking et al. | |
| 9,353,818 B2 | 5/2016 | Marking | |
| 10,933,710 B2 | 3/2021 | Tong | |
| 11,242,907 B2* | 2/2022 | Ruhmann | F16F 9/185 |
| 11,433,730 B2* | 9/2022 | Kawai | B60G 17/015 |
| 11,892,051 B2* | 2/2024 | Tucker | F16F 9/3271 |
| 2005/0120875 A1* | 6/2005 | Neumann | F15B 15/2846 |
| | | | 92/5 R |
| 2010/0109276 A1* | 5/2010 | Marjoram | B60G 99/002 |
| | | | 280/124.157 |
| 2010/0320703 A1* | 12/2010 | Lin | B60G 17/018 |
| | | | 280/5.507 |
| 2011/0202236 A1* | 8/2011 | Galasso | B62K 25/286 |
| | | | 701/37 |
| 2012/0074660 A1 | 3/2012 | Thomas | |
| 2019/0039680 A1 | 2/2019 | Angell | |
| 2019/0346004 A1* | 11/2019 | Higgins | B62J 45/42 |
| 2020/0223274 A1* | 7/2020 | Tucker | B60G 11/56 |
| 2020/0391567 A1* | 12/2020 | Baker | B60G 17/002 |
| 2021/0381570 A1* | 12/2021 | Zeissner | F16F 9/461 |
| 2021/0394577 A1* | 12/2021 | Uchino | B60G 17/0525 |

FOREIGN PATENT DOCUMENTS

| | | | |
|---|---|---|---|
| EP | 3995717 A1 | 5/2022 | |
| EP | 3995717 B1 | 6/2025 | |

\* cited by examiner

SELF-CONTAINED AIRSHOCK ASSEMBLY

CROSS-REFERENCE TO RELATED APPLICATIONS (PROVISIONAL)

This application claims priority to and benefit of U.S. Provisional Patent Application No. 63/109,755 filed on Nov. 4, 2020, entitled "SELF-CONTAINED AIRSHOCK ASSEMBLY" by Voelkel et al., and assigned to the assignee of the present application, the disclosure of which is hereby incorporated by reference in its entirety.

FIELD OF THE INVENTION

Embodiments of the present technology generally relate to a damper assembly for a vehicle.

BACKGROUND

Vehicle suspension systems typically include a spring component or components and a damping component or components. Typically, suspension systems are designed for a given ride height.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments of this invention and are therefore into to be considered limiting of its scope, for the invention may admit to other equally effective embodiments.

Figure 1A:
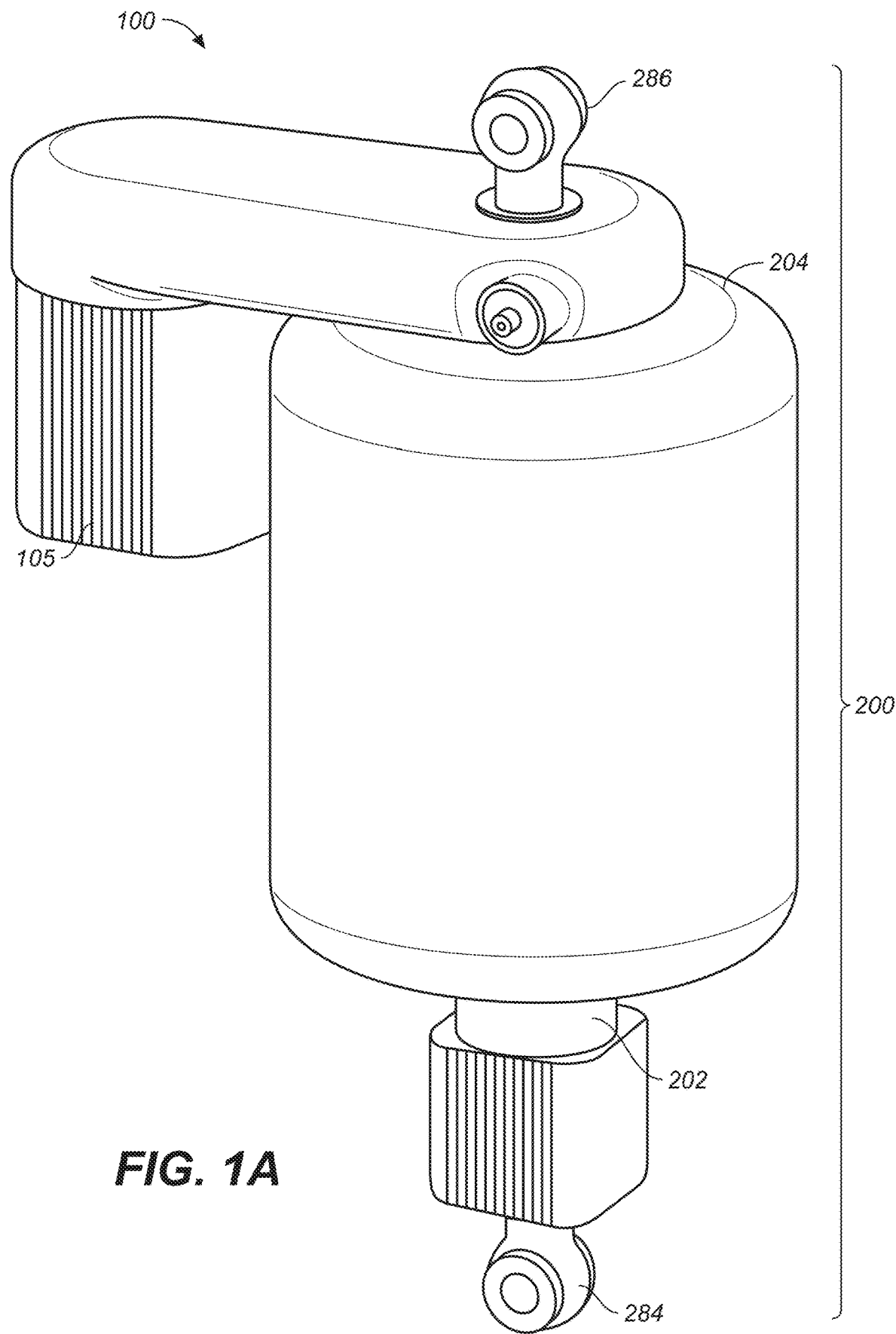
FIG. 1A is a perspective view of a self-contained airshock assembly, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Definitions

Where the definition of a term departs from the commonly used meaning of the term, applicant intends to utilize the definitions provided herein, unless specifically indicated.

In the following discussion, the term ride height refers to a distance between a portion of a vehicle and the surface across which the vehicle is traversing. Often, ride height is based on one or more of a number of different measurements such as, but not limited to, a distance between a part of the vehicle and the ground, a measurement between the top of an unsprung portion of a vehicle and a suspended portion of the vehicle there above, etc. For example, a portion of the wheel(s) (or ski, track, hull, etc.) will be in contact with the surface, while one or more shock assemblies and/or suspension components maintain the suspended portion of the vehicle a certain height there above.

In one embodiment using a wheeled vehicle example, a portion of the wheel will be in contact with the surface while a shock assembly and/or other suspension components will be coupled between a wheel retaining assembly and the suspended portion of the vehicle (often a portion of the vehicle frame). The ride height is established by the geometries of the shock assembly and/or other suspension components, the wheel retaining assembly, the wheel and tire profile, and the like.

Similarly, in a snow machine, a portion of the track (and similarly the skis) will be in contact with the surface while a shock assembly and/or other suspension components will be coupled between a track retaining assembly (and similarly the skis retaining assembly) and the suspended portion of the vehicle (often a portion of the vehicle frame). Here again, the ride height is established by the geometries of the shock assembly and/or other suspension components, the track and ski retaining assemblies, the track and/or ski profile, and the like.

In one embodiment, such as a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like). Here again, the ride height is established by the geometries of the shock assembly and/or other suspension components, with respect to the hull and the suspended portion(s) of the vehicle.

In the following discussion, the term initial SAG setting or "SAG" refers to a pre-defined vehicle ride height and suspension geometry based on the initial compression of one or more shock assemblies of the suspension system for a given vehicle when it is within its normal load envelope configuration (e.g., with a rider/driver and any initial load weight). Once the SAG is established for a vehicle, it will be the designated ride height of the vehicle, until and unless the SAG is changed.

The initial SAG for a vehicle is usually established by the manufacturer. The vehicle SAG can then be modified and/or adjusted by an owner, a mechanic, or the like. For example, an owner can modify the SAG to designate a new normal ride height based on a vehicle use purpose, load requirements that are different than the factory load configuration, an adjustment modification and/or replacement of one or more of the suspension components, a change in tire size, a performance adjustment, aesthetics, and the like.

For example, an unloaded motorcycle may have an initially assembled suspension ride height ranging from 30-38 inches from ground to saddle. The manufacturer will then set the manufacturer initial SAG for the vehicle based on a use category, a user weight/height range, the performance envelope, and the like.

In one embodiment, for example, the manufacturer could set the SAG for a 34-inch ride height (a middle of the performance envelope) based on a rider with a weight of 150 lbs. This would mean that unencumbered, the motorcycle would have a seat height that was higher than 34-inches of ride height (such as for example, a seat height of 38 inches). However, when a 150 lb. rider sits on the motorcycle, the suspension would compress and the motorcycle would be at the SAG ride height of 34-inches.

In one embodiment, an owner (or agent of the owner such as a mechanic, friend, shop, or the like) will modify the initial SAG to designate an owner specific SAG. For example, if the user wanted to have a lower ride height, they could adjust, modify, and/or replace one or more of the suspension components to reduce the SAG to 32-inches. In contrast, if the user wanted a higher ride height, they could adjust, modify, and/or replace one or more of the suspension components to increase the SAG to 36-inches.

In one embodiment, the owner could adjust, modify, and/or replace one or more of the suspension components to achieve the manufactures initial SAG. For example, if the rider weighed 250 lbs., when the rider sat on the motorcycle configured for a 150 lb. rider, the ride height would be lower than the 34-inch SAG. As such, the rider would adjust, modify, and/or replace, one or more of the suspension components to return the motorcycle to the 34-inch SAG.

In one embodiment, the initial manufacturer will use SAG settings resulting in a pre-established vehicle ride height based on vehicle use, size, passenger capacity, load capacity, and the like. For example, a truck (side-by-side, car, or the like) may have a pre-established SAG based on an expected load (e.g., a number of passengers, an expected cargo requirement, etc.).

Regardless of the vehicle type, once the SAG is established, in a static situation the ride height of the expectedly loaded vehicle should be at or about the established SAG. When in motion, the ride height will change as the vehicle travels over the surface, and while the suspension system is used to reduce the transference of any input forces received from the surface to the rest of the vehicle it is also used to maintain the vehicle's SAG.

However, when additional weight is added to the vehicle, the suspension and one or more shock assemblies will be compressed, and the vehicle ride height will be less than the SAG.

For example, if a vehicle such as a snow machine, motorcycle, bicycle, automobile, etc. is loaded with an additional 100 lbs. of cargo in the rear, the extra 100-pound load will cause shock assembly compression (and the like) thereby causing the vehicle to ride lower in the rear.

Additional information regarding SAG and SAG setup can be found in U.S. Pat. No. 8,838,335 which is incorporated by reference herein, in its entirety.

In the following discussion, the term "filled" refers to a spring, chamber, etc. being either totally or partially filled with a fluid or gaseous media.

The term "bellows" refers to one or more walls of a spring material such as rubber, plastic or other malleable material. A bellows may form one continuous wall, such as the wall of a two-compartment bellows or cylindrical bellows. However, a bellows may have various shapes and include more than one wall.

The term "airspring" refers to a substantially sealed bellows that may be totally or partially filled with a spring filling fluid such as a gas or liquid. An example of an airspring, having a mount attached to each of the airspring's open ends to seal off each of the open ends. Although a few types of airsprings are described herein and shown in the drawings, the airspring may have various shapes.

The term "springy material" refers to a springy substance such as rubber or plastic that resists compression and springs back to substantially its original shape when a compressive force is no longer exerted on the substance. Examples of springy materials include the types of rubbers and/or plastics used to form the walls of the bellows.

The term "spring filling fluid" refers to a fluid, that is used to fill the bellows of the airspring and provide a pressure within the airspring that is used to lower, maintain, or raise an overall airshock length. By lowering, maintaining, and/or raising the overall airshock length, when the airshock is used as part of a vehicle suspension the ride height of the vehicle can be adjusted. One example of such a resistance material is air, but other types of gases (e.g., nitrogen, or the like) or liquids can also be used as a spring filling fluid.

The term "cylinder resistance material" refers to a gas or fluid, such as oil, used as a resistance material in the cylinder of a shock absorber.

The term "circumferentially engages" refers to a mount or other object circumferentially contacting a cylinder or piston of a shock absorber. In one embodiment, a circumferential engagement may be used to fix the cylinder in place with respect to the airspring mount that engages the cylinder. In one embodiment, a circumferential engagement may be used to guide the sliding of the piston with respect to the airspring mount that engages the piston.

In the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used. Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated actively (e.g., using a powered solenoid, or the like) to alter the operation or characteristics of a valve and/or other component. As a result, in the field of suspension components and valves, the terms "active", "active", "actively controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the following discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

As used herein, the terms "down", "up", "down-ward", "upward", "lower", "upper" and other direction references are relative and are used for reference only.

Conventional Airshock Suspension Systems

Conventional airshock suspension systems often include a plurality of components such as, but not limited to, two front airsprings as respective front shock absorbing devices, two rear airsprings as respective rear shock absorbing devices, a compressor, a supplemental reservoir tank, a main reservoir tank, at least one pressure switch, a front junction box, a rear junction box, a plurality of solenoids in each of the front and rear junction boxes, a front control panel, a rear control panel, a plurality of switches in the front and rear control panels, front gauge hoses, rear gauge hoses, a battery, a number of electrical wiring harnesses, a front air pressure gauge, and all of the plumbing therebetween.

In general, the pressure switch is mounted on the compressor and causes the compressor to turn on when the pressure in main reservoir tank drops below a minimum pressure and causes the compressor to turn off when the pressure in main reservoir tank reaches a maximum pressure. The compressor is connected to a supplemental reservoir tank by a hose and the supplemental reservoir tank is connected to a main reservoir tank by a connecting hose. The compressor generates compressed air to fill main reservoir tank and a supplemental reservoir tank.

Main reservoir tank is connected by a supply hose to supply a rear junction box. The rear junction box is connected to a front junction box by a connection so that front junction box may be supplied with air from main reservoir tank. The front airsprings are supplied with air from front junction box by front delivery hoses. The rear airsprings are supplied with air from the rear junction box by rear delivery hoses. The front control panel is pneumatically connected to delivery hoses by the front junction box and front gauge hoses. The rear control panel is pneumatically connected to delivery hoses by rear junction box and rear gauge hoses.

The battery supplies power to the compressor through a wire including a fuse and terminating at a ground, which may be the chassis of a vehicle on which the air shock absorber/spring system is mounted. The battery also supplies power to the front and rear control panels by a front and a rear wiring harness respectively.

In operation, the air pressure in the airsprings is measured by the control panel on one or more air pressure gauges that indicate the air pressure for the respective airsprings. In order to adjust the pressure, an appropriate switch on the control panel is activated to trigger the one or more solenoids in the front and/or rear junction box. The solenoids, e.g., pneumatic valves operated by an electric coil, are used to inflate one or more of the airsprings by releasing air from the main reservoir tank into the appropriate shock absorbing device. The solenoids are also used to deflate one or more of the airsprings by releasing air from the appropriate shock absorbing device into the atmosphere through exhaust ports or the like.

Self-Contained Airshock Assembly

Figure 1B:
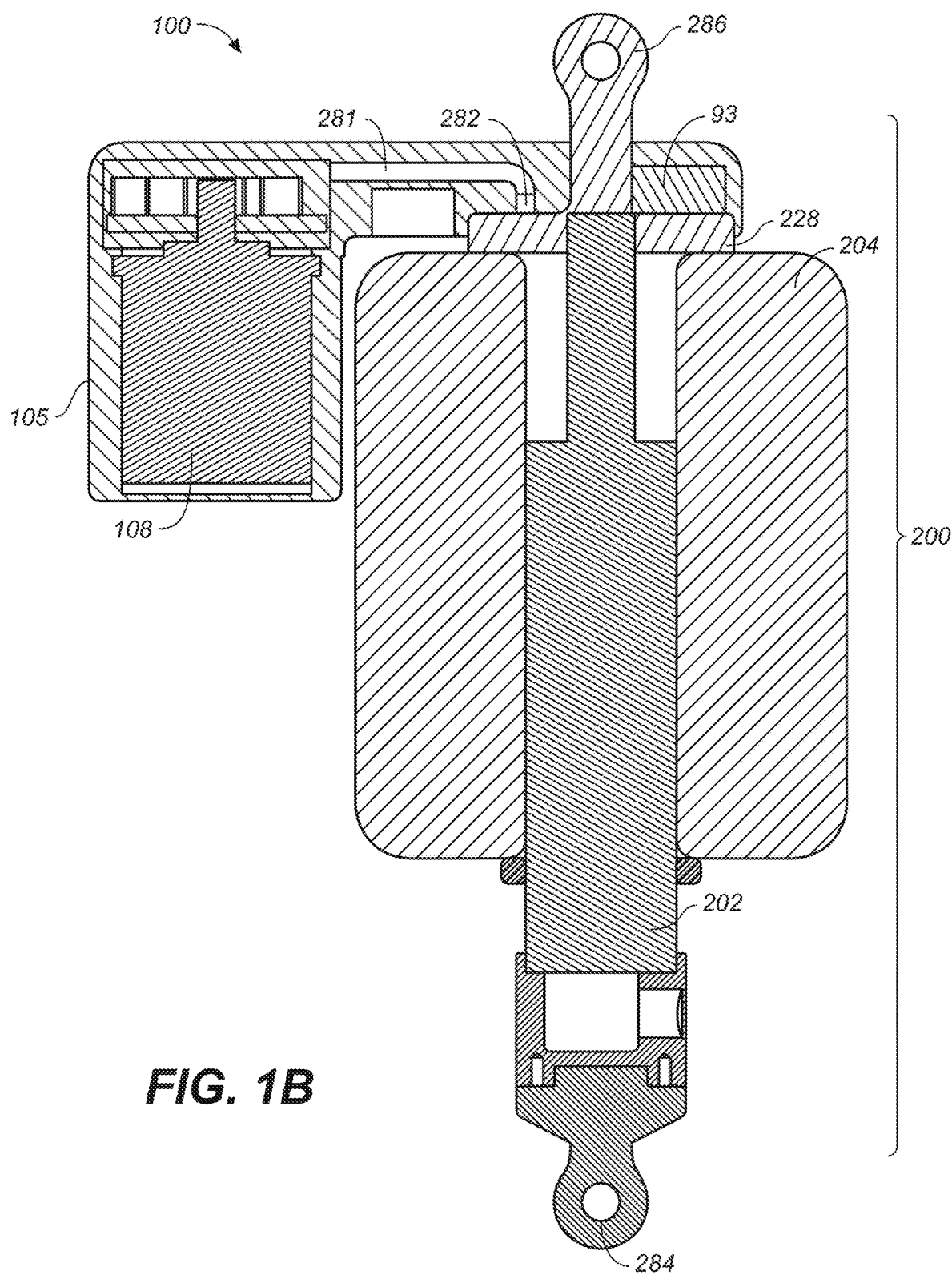
FIG. 1B is a side-sectional view of the self-contained airshock assembly as shown in FIG. 1A, in accordance with an embodiment.

Referring now to FIG. 1A, a perspective view of a self-contained airshock assembly 100 is shown in accordance with an embodiment. FIG. 1B is a side-sectional view of the self-contained airshock assembly of FIG. 1A, shown in accordance with an embodiment.

Referring now to FIGS. 1A and 1B, in one embodiment, the self-contained airshock assembly 100 includes a compressor assembly 105 and an airshock 200.

In one embodiment, compressor assembly includes an air compressor 108, a fluid flow path 281 (to provide a fluid pathway between the compressor assembly 105 and the airshock 204), at least one active or semi-active solenoid integrated with an orifice 282 located within (and used to control the flow of fluid via) fluid flow path 281, and a sensor package 93 containing one or more sensors and electrical components. In one embodiment, the at least one solenoid is a deflate solenoid.

Figure 2A:
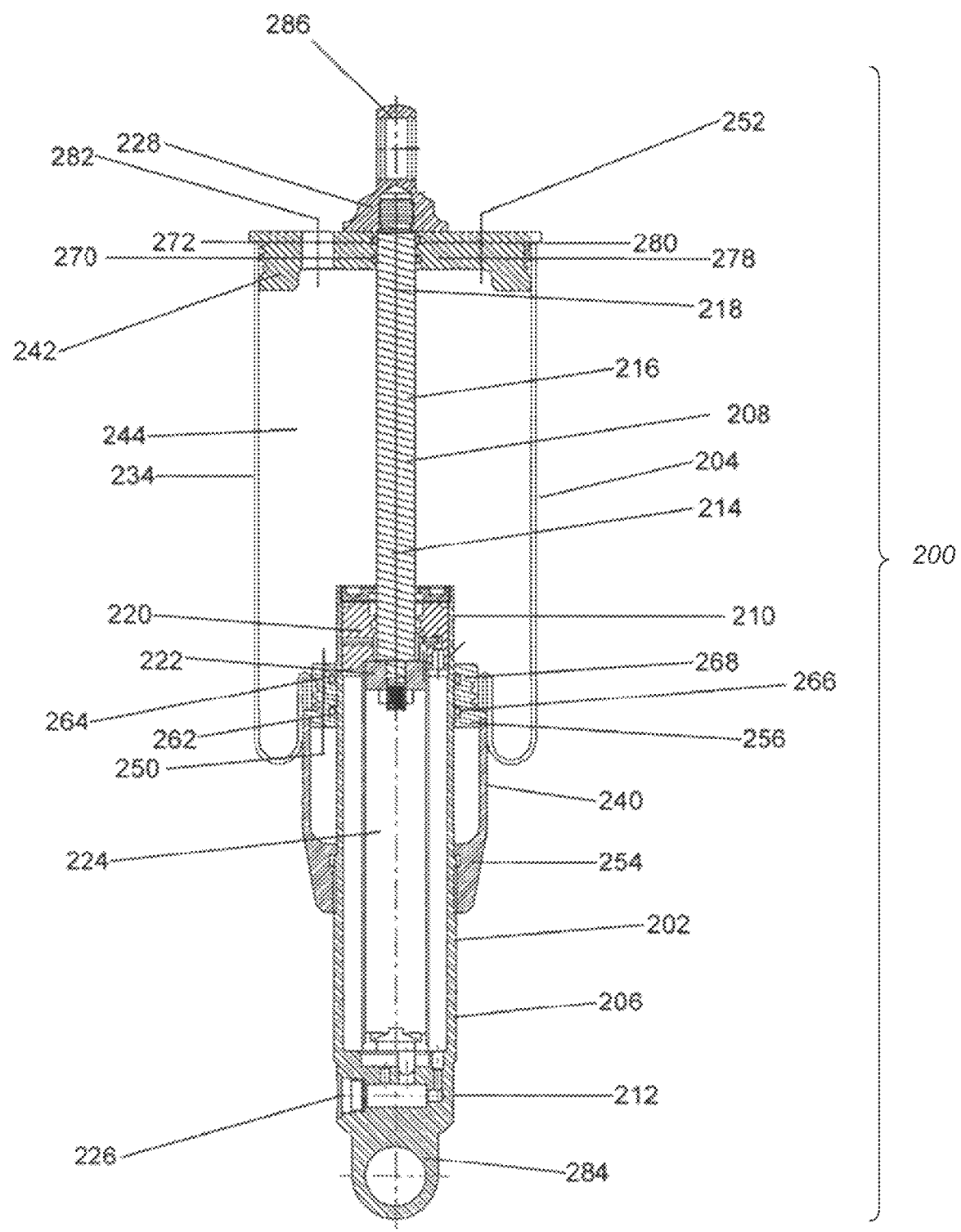
FIG. 2A is a side-sectional view of the airshock of the self-contained airshock assembly in an extended state, in accordance with one embodiment.
Figure 2B:
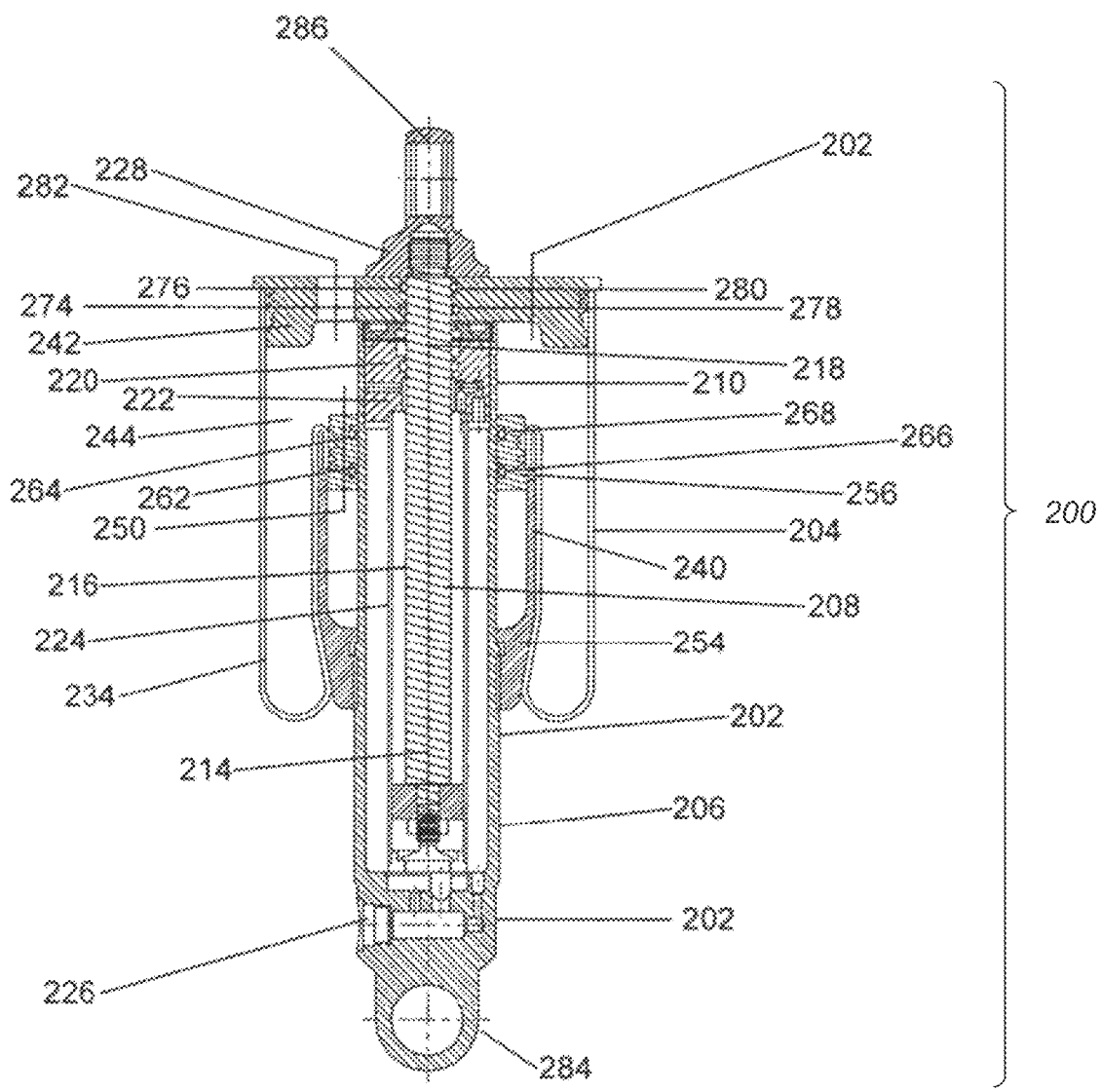
FIG. 2B is a side-sectional view of the airshock of the self-contained airshock assembly in a compressed state, in accordance with one embodiment.

In one embodiment, airshock 200 is a combination of a shock absorber 202 and an airspring 204. In one embodiment, airspring 204 is a hollow type airspring as shown in FIGS. 2A and 2B. Although a hollow type airspring 204 is shown, it should be appreciated that the airspring 204 of airshock 200 could be another type of airspring such as, for example, a float airspring architecture such as a FOX FLOAT NA Airspring.

In one embodiment, sensor package 93 can include or be communicatively coupled with one or a plurality of components such as, for example, an air pressure sensor, ride height sensor, an ECU, a GPS, and the like. In one embodiment, the components of sensor package 93 can be found within the single self-contained airshock assembly 100. In one embodiment, some of the components of sensor package 93 can be found within the single self-contained airshock assembly 100 and other components could be communicatively coupled with sensor package 93. For example, sensor package 93 could include wired or wireless communications capabilities, and be able to communicate with other components, other self-contained airshock assemblies, the vehicle ECU, and the like, such as shown and described in FIG. 7.

In one embodiment, self-contained airshock assembly 100 includes a filter and/or moisture sensor to prevent air compressor 108 from ingesting water. In one embodiment, self-contained airshock assembly 100 includes a built in deflation solenoid to lower air pressure in the airshock.

In one embodiment, compressor assembly 105 includes an air compressor 108, fluid flow path 281, and an orifice 282. As discussed herein, in one embodiment, orifice 282 includes at least one solenoid (such as described in the active valve discussion herein) that is used to allow gas or fluid to be pumped into airspring 204 via air compressor 108, or release the gas or fluid out of airspring 204. Compressor assembly 105 is shown and described in further detail in FIG. 2C and the discussion associated therewith.

In one embodiment, since all of the technology, components, and pieces are integrated into self-contained airshock assembly 100, a number of benefits are realized. For example, in one embodiment, air compressor 108 directly fills the airspring 204. As such, there is no reservoir or tank that is standing by to inflate airspring 204. Since there is no air tank, there are no inflate solenoids. Similarly, self-contained airshock assembly 100 eliminates external airlines and fittings to eliminate leaks, cost, and installation time, eliminates external ride height sensors to eliminate potential damage and improper installation, eliminates reservoir to save space, cost, and weight, and eliminates wiring harness to eliminate cost, installation time, increase reliability In one embodiment, sensor package 93 of self-contained airshock assembly 100 is indicative of one or more sensors and or electrical components such as, air pressure sensors, ride height sensors, ECU and the like. In one embodiment, the location of the sensors in sensor package 93 can be in different locations. For example, in one embodiment, the air pressure sensor can be integrated with an airsleeve cap 228. In one embodiment, a ride height sensor is integrated with the piston rod 208 (of FIGS. 2A and 2B).

In one embodiment, self-contained airshock assembly 100 is controlled by an electronic control unit (ECU). In one embodiment, as shown in FIG. 1B, the ECU is integrated into the airsleeve cap 228 (e.g., as a part of sensor package 93) and the integrated ECU includes its own power. In one embodiment, the ECU also includes wireless communications capabilities, and as such, there would not even be a need for any wiring to be used during the installation of self-contained airshock assembly 100.

In one embodiment, if the shock absorber 202 is an active shock that includes one or more active valves, the ECU could utilize the wiring already present in the active shock absorber 202 for power and/or communications.

In one embodiment, the ECU can modify the compression and/or rebound settings of the shock absorber 202 of the self-contained airshock assembly 100. In one embodiment, the ECU will modify the compression and/or rebound settings of the shock absorber 202 depending upon terrain, ride type, and the like. In one embodiment, the ECU will modify the compression and/or rebound settings of the shock absorber 202 in real time such as based on actual performance, based on actual location (such as GPS information) or the like. In one embodiment, the ECU will modify the compression and/or rebound settings of the shock absorber 202 as part of a program or application operating on the ECU, a user's mobile device, and the like.

In one embodiment, the ECU is able to modify the pressure settings of airspring 204 of the self-contained airshock assembly to adjust compression, rebound, load capacity, and/or ride height. In one embodiment, the ECU will modify the pressure settings of airspring 204 depending upon terrain, ride type, and the like. In one embodiment, the ECU will modify the pressure settings of airspring 204 in real time such as based on actual performance, based on actual location (such as GPS information) or the like. In one embodiment, the ECU will modify the pressure settings of airspring 204 as part of a program or application operating on the ECU, user's mobile device, and the like.

In one embodiment, the ECU is able to modify the compression and/or rebound settings of the shock absorber 202 as well as the pressure settings of airspring 204 to provide full adjustment capabilities for the self-contained airshock assembly 100.

In one embodiment, the ECU will use GPS or other location based data to determine the type of terrain inputs to expect and adjust filtering and other sensor signal processing variables to optimize system performance based on that information.

In one embodiment, the ECU can store a number of different SAG settings that are to be used for different purposes (e.g., on road driving, offroad driving, racing, performance, best gas mileage, towing, being towed, low clearance environments (e.g., parking garages), high clearance environments (e.g., rocky terrain), and the like). The different SAG settings could be based on terrain, location, previous user preferences/selections, crowdsourced data, and the like. In one embodiment, the ECU will adjust the self-contained airshock assembly 100 to establish the appropriate SAG setting for the vehicle based on the present vehicle purpose.

In one embodiment, ECU of sensor package 93 will also receive other sensor input such as, but not limited to, location information (e.g., GPS input, navigation input, terrain information, etc.), passenger load information (e.g., additional weight input, occupied seat sensors, etc.), vehicle load information (e.g., towing, weigh loaded in or on vehicle such as cargo, etc.), speed (from the vehicle ECU), accelerometer information (from vehicle sensors, a user's mobile device, etc.), inclinometers, sag sensors, and/or other sensor measurements. This additional information would be used by the ECU to provide the appropriate setting changes to the shock absorber 202 and/or airspring 204 of single self-contained airshock assembly 100, to a plurality of communicatively coupled self-contained airshock assemblies, and the like.

In one embodiment, eliminating the wiring harness, air reservoir, airline, airline fittings, external ride height sensors, and inflate solenoids increases reliability and minimized installation errors. Moreover, integrating all of the components into a single self-contained airshock assembly 100, many of the components, including the most sensitive components) are protected from environmental factors, e.g., dirt, mud, rocks, weather, water, etc.

In one embodiment, additional benefits provided by the self-contained airshock assembly 100 include, but are not limited to: weight reduction, usability in additional vehicles, ease of installation, and the like.

Weight Reduction

In one embodiment, because of the reduction of components, the weight of the self-contained airshock assembly 100 reduces the overall weight added to the vehicle by a prior air suspension assembly system. For example, by eliminating the air tank (or reservoir), the air plumbing, a number of solenoids, and numerous other components, the self-contained airshock assembly 100 can remove approximately 10 lbs. of weight. While this may be negligible in a Semi-Trailer that ways a number of tons, it will become more valuable when used on smaller vehicles such as side-by-sides, snowmobiles, ATVs, motorcycles, and the like.

Useable in More Vehicles

In one embodiment, because of the self-contained airshock assembly 100 ride height adjusting capabilities, the all-in-one system opens the door to using self-contained airshock assembly 100 on vehicles that did not previously have the room or weight availability to use a multi-piece airshock with reservoir type system.

For example, in a vehicle such as a motorcycle or even a bicycle, the ability to add one or more self-contained airshock assembly 100 to the suspension would provide significant advantages. For example, the ability to lower the rear ride height of a motorcycle's geometry (and likely a bicycles geometry) is being explored in motorcycle racing as it provides significant advantages in initial acceleration. Moreover, being able to raise the rear ride height back up after the initial acceleration, returns the motorcycle to the appropriate geometry for the desired cornering, decelerating, and other handling characteristics. This value could also be found in an off road situation such as going uphill or downhill where ride height changes will provide improved handling and increase performance capabilities for the underlying vehicle.

Installation Benefits

In one embodiment, the installation of the self-contained airshock assembly 100 is significantly simplified, and much easier for a backyard mechanic than installing prior multi-part air shock suspension systems. For example, the installation process for the self-contained airshock assembly 100 is basically the replacing of any one or more existing shock assemblies with the self-contained airshock assembly 100.

In one embodiment, depending upon the self-contained airshock assembly 100 configuration, the only additional step would be the optional wiring from the airshock to the modular active damping control system 700.

Referring again to FIGS. 1A and 1B, in one embodiment, airshock 200 includes a shock absorber 202, an airspring 204, a cylinder end mount 284, and a piston end mount 286. Airshock 200 is shown and described in further detail in FIGS. 2A and 2B and the discussion associated therewith.

In one embodiment, shock absorber 202 is used to reduce (or dampen) the forces imparted onto a vehicle as it passes over imperfections that exist on a surface being traversed, e.g., as they pass through the vehicle suspension and to the vehicle body. In other words, it reduces the bumping, vibration, and jostling felt by a passenger in the vehicle. As discussed in further detail herein at FIGS. 4-6, the compression and/or rebound settings of the shock absorber 202 can be modified depending upon terrain, ride type, and the like. In one embodiment, if the shock absorber 202 includes one or more active valves, the compression and/or rebound settings of the shock absorber 202 can be modified in real time, based on location (such as GPS information), based on actual performance, changed as part of a program or application operating on an ECU or user's mobile device, and the like.

In one embodiment, while airspring 204 provides an amount of damping it is also used to adjust load capacity and ride height by inflating or deflating (e.g., increasing or decreasing the air pressure therein). As discussed in further detail herein, the pressure settings of airspring 204 can be modified depending upon terrain, ride type, and the like. In one embodiment, the pressure settings of airspring 204 can be modified in real time, based on location (such as GPS information), based on actual performance, changed as part of a program or application operating on an ECU or user's mobile device, and the like.

In one embodiment, a vehicle, such as a pickup truck for example, will have SAG settings resulting in a pre-established ride height. In a static situation, the ride height of the pickup truck is at or about the SAG. When in motion, the ride height will change as the vehicle travels over the surface, and while the suspension system is used to reduce the transference of any input forces received from the surface to the rest of the vehicle, another goal of the suspension system is to return the vehicle to its SAG.

However, if, for example, the bed of the pickup truck is loaded with 500 lbs. of cargo, the vehicle ride height will no longer be the SAG ride height. Instead, the extra 500 pound load on the suspension will cause additional compression the rear self-contained airshock assembly 100 thereby causing the vehicle to ride lower in the rear. In general, this lower rear ride height, or sagging of the rear, will move the ride height out of SAG and change the vehicle geometry, e.g., cause a slant upward from rear to front. While the vehicle sensors described herein can identify the additional compression the rear self-contained airshock assembly 100, often, the change in ride height can also be visually identified by a reduction in space between the wheel and the wheel well as compared to other wheels and wheel wells on the vehicle, or by the angle of the vehicle.

In one embodiment, the additional load will also reduce the available operating length of the rear self-contained airshock assembly 100 which can be detrimental to steering and performance characteristics, could cause an unwanted impact between wheel (or wheel suspension) and frame, increase the roughness of the ride, increase suspension stiffness, cause suspension bottom out, loss of control, tire blow out, and the like.

In one embodiment, when the weight is added to the vehicle, if it is not centered, it will not only cause a change in the front or rear SAG (depending upon the load location), but will also cause SAG changes that will differ between the left and right side of the vehicle. For example, if the load is in the rear and off-center to the left, the load-modified ride-height of the vehicle will be lopsided, such that the left rear suspension will be compressed more than the right rear suspension causing the rear left of the vehicle to have a lower ride-height than the right rear. Thus, while the entire rear of the vehicle will be out of SAG and therefore riding lower than the front of the vehicle, it will also be lopsided between the left and right sides. Such lopsided suspension characteristics can be extremely deleterious while driving and will often result in a number of issues including, but not limited to: steering problems, suspension bottom out, loss of control, tire blowout, and vehicle rollover.

In one embodiment, by adding fluid pressure to (or inflating) the rear airspring 204, the airspring 204 will raise the self-contained airshock assembly 100 upward toward its SAG ride height. In one embodiment, the self-contained airshock assembly 100 will raise the truck all the way back to the SAG ride height. In another embodiment, if the load is too heavy, the self-contained airshock assembly 100 will raise the rear of the truck, but it may not reach the SAG ride height.

Using the same pick-up truck example, if the pick-up truck ride height has been adjusted back toward (or to) the SAG, when the cargo is unloaded from the truck, the ride height will again be changed. That is, the removal of the 500 pound load on the suspension will decompress the rear self-contained airshock assembly 100 and cause the vehicle to rise in the rear. In general, this rear rise will change the vehicle geometry, e.g., cause a slant downward from rear to front. The rear rise can be detrimental to steering and performance characteristics, could increase the roughness of the ride (e.g., self-contained airshock assembly 100 stiffness), and the like.

In one embodiment, by removing fluid pressure from (or deflating) the rear airspring 204, the airspring 204 will lower the self-contained airshock assembly 100 back down to its SAG (e.g., the pre-established ride height).

In one embodiment, by using the airspring 204 of self-contained airshock assembly 100 to adjust the ride height, the damping and rebound characteristics of the shock absorber 202 will remain relatively unchanged, although there may be a slight amount of preload adjustment due to the additional load and/or pressure input by the airspring 204.

In one embodiment, airspring 204 of self-contained airshock assembly 100 is used to adjust the ride height such that mechanical position sensitive damping architectures of the shock absorber 202 will be properly positioned. For example, if shock absorber 202 includes an internal bypass design with mechanical position sensitive damping architectures, the ride height adjustment by airspring 204 will need to establish the appropriate ride height to correspond with the fixed damping zones of the internal bypass design. Thus, in one embodiment, the airspring 204 of self-contained airshock assembly 100 will be used to adjust the ride height to ensure the damping and rebound characteristics of the shock absorber 202 remain available.

In one embodiment, all of the ride height adjustments and air pressures are automatically performed by the self-contained airshock assembly 100 with no user interaction.

Figure 7:
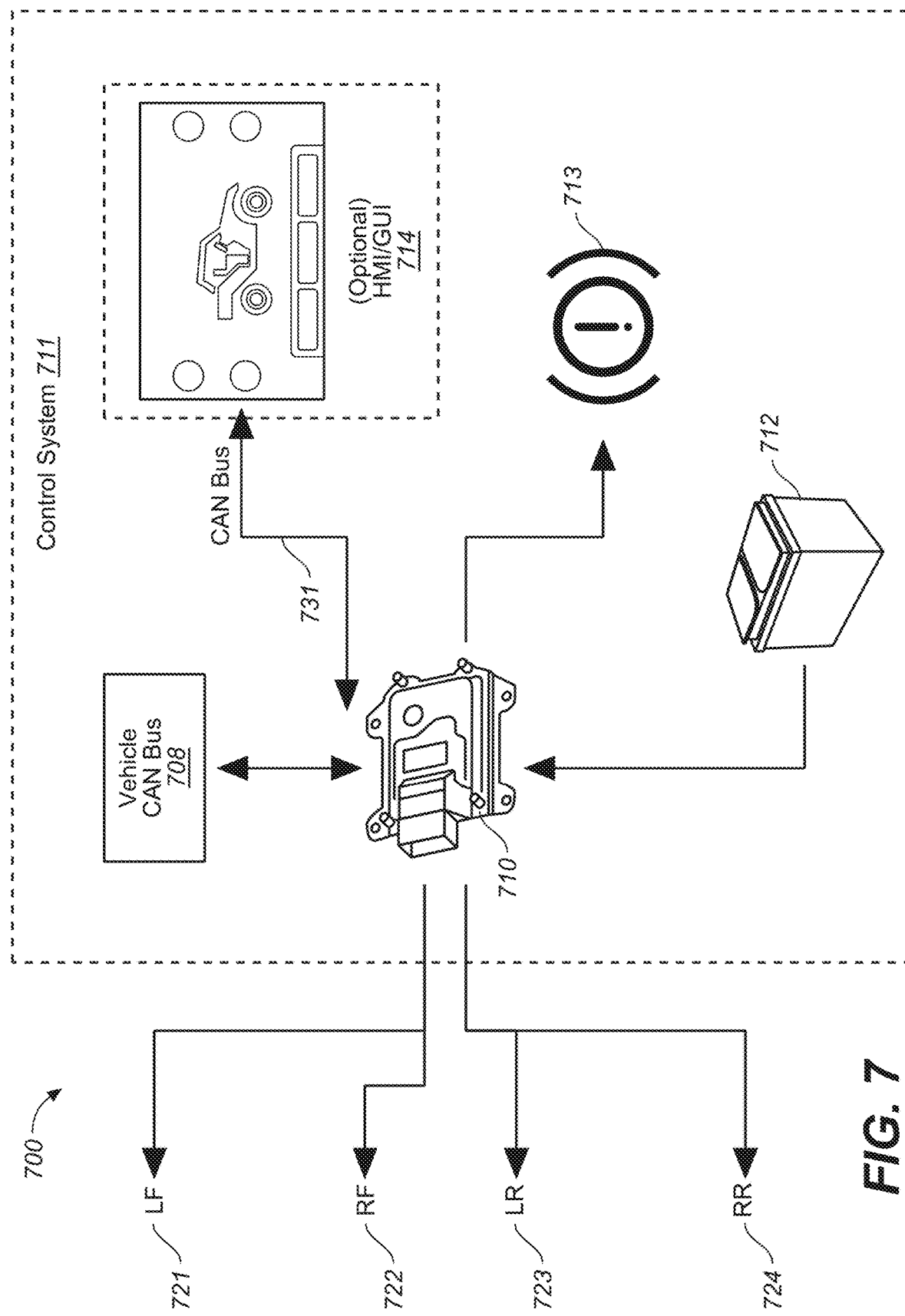
FIG. 7 is a block diagram of an active damping control system, in accordance with an embodiment.

In one embodiment, the ride height and air pressure adjustments are automatically performed by the self-contained airshock assembly 100 with no user interaction and are available to be displayed to a driver or passenger in a GUI such as an infotainment system like HMI/GUI 714 of FIG. 7.

In one embodiment, the ride height and air pressure adjustments are automatically performed by the self-contained airshock assembly 100 with no user interaction and are available to be displayed to a driver or passenger in a GUI such as an infotainment system HMI/GUI 714 while the infotainment system or other input device allows the ride height and/or air pressure of the self-contained airshock assembly 100 to also be adjusted by the driver or passenger.

In one embodiment, the ride height and air pressure adjustments for the self-contained airshock assembly 100 are displayed to a driver or passenger in a GUI such as an infotainment system HMI/GUI 714, where the infotainment system or other device will provide an ability for the user to modify one or more of the ride height and/or air pressure. In one embodiment, this allows the ride height and/or air pressure of the self-contained airshock assembly 100 to be only manually adjusted by the driver or passenger. Further discussion and examples of a control system such as control system 711 are described in U.S. Pat. No. 10,933,710, the whole of which is incorporated by reference herein, in its entirety.

Airshock

Referring now to FIG. 2A, a side-sectional view of the airshock 200 of the self-contained airshock assembly 100 is shown in an extended state in accordance with an embodiment. FIG. 2B, a side-sectional view of the airshock 200 of the self-contained airshock assembly 100 is shown in a compressed state in accordance with one embodiment.

In one embodiment, airshock 200 is a combination of a shock absorber 202 and an airspring 204. In one embodiment, airshock 200 has a cylinder end mount 284 and a piston end mount 286. For purposes of clarity, in the following discussion if a component runs axially along the airshock the term "proximal" will be used to identify the component (or a portion of the component) being (or moving) closer to the cylinder end mount 284. In contrast, the term "distal" will be used to identify the component (or a portion of the component) being (or moving) closer to the piston end mount 286.

Thus, for example, the shock absorber 202 includes a cylinder 206 and piston rod 208. Cylinder 206 includes a (proximal) first cylinder end 210 that extends into airspring 204 and a (distal) second cylinder end 212 that is fixedly coupled with cylinder end mount 284.

Piston rod 208 slides into and out of cylinder 206 and includes a piston 222 at a (proximal) first end within cylinder 206, a middle piston portion 216 that passes through airspring 204 and moves into and out of cylinder 206, and a (distal) second end 218 that extends from airspring 204 and is fixedly coupled with piston end mount 286.

In one embodiment, cylinder 206 includes a bushing 220 that slidably engages piston rod 208 as it slides into and out of cylinder 206. In one embodiment, piston rod 208 includes an end ring mounted prior to piston 222 that slidably engages a cylinder chamber 224 of cylinder 206 and prevents piston 222 from completely sliding through bushing 220 and out of cylinder 206. A cylinder resistance material such as oil is present in cylinder chamber 224 and provides resistance against the movement of piston 222 both during the compression stroke (e.g., as the piston 222 moves through cylinder 206 toward second cylinder end 212) and during the rebound stroke (e.g., as the piston 222 moves through cylinder 206 toward first cylinder end 210. Cylinder 206 includes a conventional resistance adjusting device 226 that may be used to adjust the pressure of cylinder resistance material in cylinder chamber 224, and thereby adjust the resistance piston 222 experiences as piston rod 208 moves into and out of cylinder 206.

Airspring 204, (which is filled with a gas or fluid) includes a bellows 234, a two-part (proximal) first mount 240, a (distal) second mount 242, and an interior chamber 244.

Bellows 234 also includes a (proximal) first compartment 246; a (distal) second compartment 248; a (proximal) first open end 250; and a (distal) second open end 252. Two-part first mount 240 includes a (proximal) first adapter 254 and a (distal) second adapter 256, which may both be made from a hard substance such as plastic or metal. In one embodiment, first adapter 254 and/or second adapter 256 are made from aluminum.

In one embodiment, second adapter 256 of two-part first mount 240 is mounted on first open end 250 to close first open end 250. In one embodiment, first adapter 254 is mounted on cylinder 206 and abuts second adapter 256. Depending on the particular application, first adapter 254 may or may not be fixed to second adapter 256. In one embodiment, if first adapter 254 merely abuts, and is not fixed to second adapter 256, second adapter 256 may be moved distally by a user of airshock 200 to allow for the servicing of shock absorber 202 (such as stiffer and/or softer springs, changes to spring preload, modifications to change a base level or existing level of damping required, etc.). However, second adapter 256 is prevented from moving beyond where it abuts first adapter 254 as shown in FIGS. 2A and 2B.

In one embodiment, second adapter 256 is mounted on second open end 252 by forcing fitting, screw fitting, or the like to close second open end 252. First adapter 254 may be fixed to cylinder 206 by using a screw fitting, welding, pressure fitting, or the like. In one embodiment, second adapter 256 includes two rubber O-rings 262 and 264 that are mounted in circular grooves 266 and 268, respectively. O-rings 262 and 264 assist in providing a tight seal between cylinder 206 and second adapter 256. In one embodiment, second open end 252 is closed by a (distal) second mount 242. In one embodiment, second mount 242 is mounted on bellows 234 using a forcing fitting, screw fitting, or the like. In one embodiment, second mount 242 is made from a strong and durable material such as plastic or metal such as aluminum.

In one embodiment, second mount 242 includes two rubber O-rings 274 and 276 that are mounted in two respective circular grooves 278 and 280. O-rings 274 and 276 slidably engage piston rod 208 as piston rod 208 slides into and out of airspring 204. In one embodiment, second mount 242 includes a (distal) orifice 282 (having at least one active or semi-active solenoid integrated therewith) within the fluid flow path 281 which allows gas or fluid to be pumped into airspring 204 or lets the gas or fluid out of airspring 204. In one embodiment, the gas or fluid is pumped into airspring 204 using a pumping mechanism, such as air compressor 108 that is fluidly coupled with airspring 204 via fluid flow path 281.

In one embodiment, compressor assembly 105 includes a pressure monitoring and a gas or fluid supply system to maintain and/or adjust the air pressure in airspring 204.

Airshock 200 may be mounted similarly to a conventional shock absorber 202 using cylinder end mount 284 and piston end mount 286. Although cylinder end mount 284 and piston end mount 286 are shown as being orthogonally oriented with respect to each other in FIGS. 2A and 2B, because piston rod 208 is free to rotate with respect to cylinder 206, cylinder end mount 284 and piston end mount 286 may be arranged at any rotational angle to allow airshock 200 to be mounted on a car or other vehicle. Examples of different types of shock absorber 202 and their components as well as adjustment/modification/replacement aspects including manually, semi-actively, and/or actively controlled aspects and wired or wireless control thereof is provided in U.S. Pat. Nos. 8,838,335; 9,353,818; 9,682,604; 9,797,467; 10,036,443; 10,415,662; which are incorporated by reference herein, in their entirety.

FIG. 2A shows airshock 200 in an extended configuration. In FIG. 2A, airspring 204 is filled with a spring filling fluid and urges piston 222 toward first cylinder end 210 of cylinder 206. In the extended configuration shown in FIG. 2A, airshock 200 functions like a mechanical spring to provide the desired vehicle ride height.

FIG. 2B shows airshock 200 in a compressed configuration. In FIG. 2B, airshock 200 is compressed due to an outside force, such as is caused when a vehicle on which airshock 200 is mounted hits a bump. In FIG. 2B, the compressive force has caused piston 222 to move toward second cylinder end 212, and urged second mount 242 toward first cylinder end 210 of cylinder 206 thereby compressing airspring 204. In one embodiment, as airshock 200 is compressed and piston 222 is forced into cylinder 206 toward first cylinder end 210, the cylinder resistance material present in cylinder chamber 224, resists the motion of piston rod 208 into cylinder 206 thereby dampening the motion of piston 222. Also resisting the compression of airshock 200 is the spring filling fluid that is filling airspring 204.

Thus, in one embodiment, when in use on a vehicle, self-contained airshock assembly 100 provides a dual resistance motion dampening action because of the interactions of the shock absorber 202 and the airspring 204. The self-contained airshock assembly 100 also provides an axially aligned dual resistance motion dampening action, because the shock absorber 202 and the airspring 204 share the same axis and, therefore, the principal compression and expansion motions of the shock absorber 202 and airspring 204 are axially aligned.

In one embodiment, by adjusting the amount/pressure of the spring filling fluid in the airspring 204, any number of intermediate configurations between those shown in FIGS. 2A and 2B may be obtained. For example, more or less air may be pumped into the airspring 204 to adjust the ride height of the vehicle relative to the wheel on which the self-contained airshock assembly 100 is mounted.

In one embodiment, the amount of spring filling fluid and/or the type of spring filling fluid the is filling airspring 204 will also affect the springiness of the airshock 200, and hence, the springiness of the ride of the vehicle on which the self-contained airshock assembly 100 is mounted.

In one embodiment, the cylinder end mount 284 and piston end mount 286 of the self-contained airshock assembly 100 are similar in form and function to conventional shock absorber mounts. Moreover, the length of a given self-contained airshock assembly 100 is designed to be similar to standard shock absorbers. As such, a do-it-yourself (DIY) owner or general vehicle mechanic that can replace a shock absorber would have the skills and capability to replace a legacy shock absorber with the self-contained airshock assembly 100.

In one embodiment, the shape of the bellows may be altered during the manufacture or assembly of self-contained airshock assembly 100 to allow the self-contained airshock assembly 100 to be more easily mounted in particular vehicle suspension system or may be altered if a spring filling fluid other than air is used.

Compressor Assembly

Figure 2C:
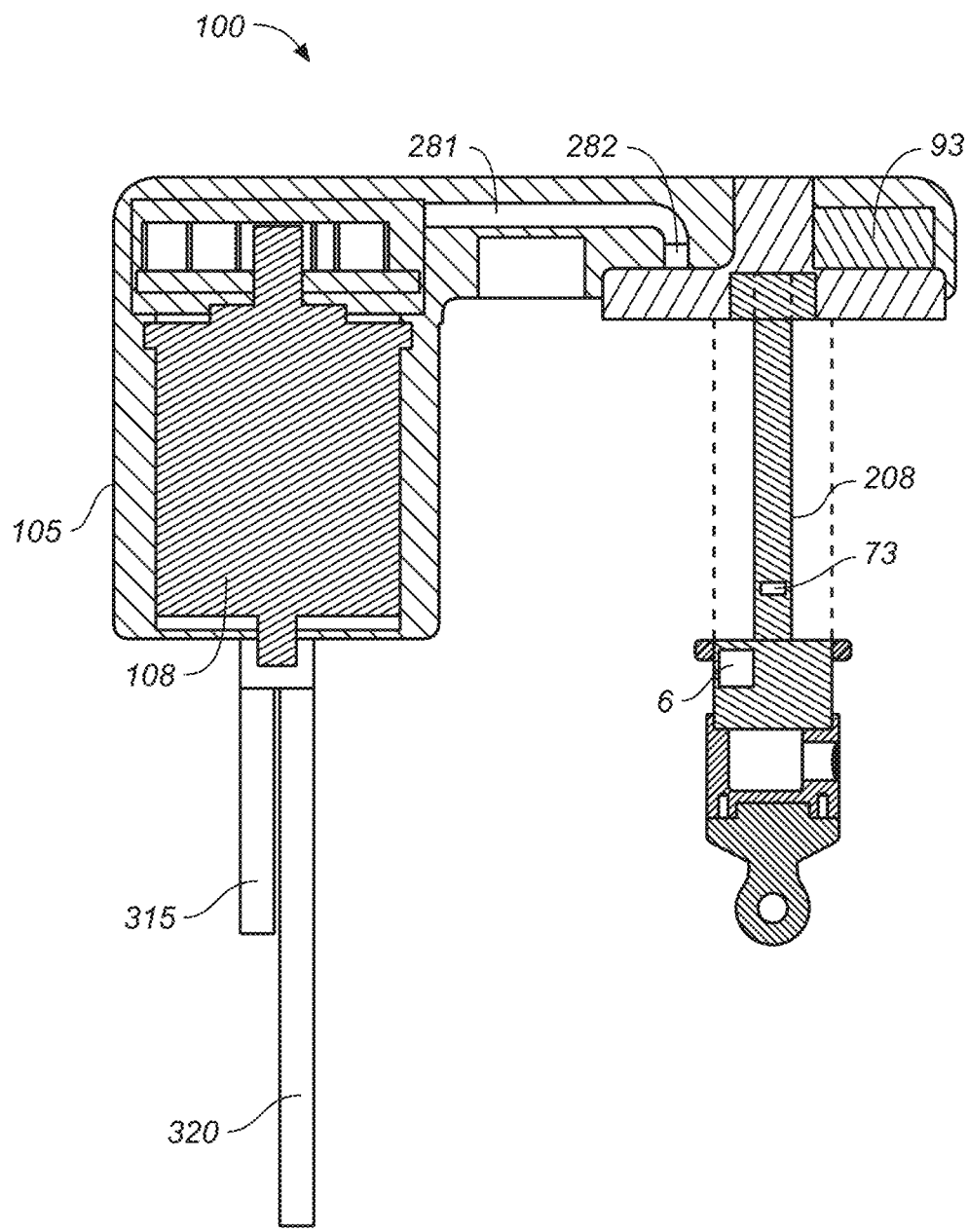
FIG. 2C is a side-sectional view of the compressor assembly portion of the self-contained airshock assembly, in accordance with one embodiment.

FIG. 2C is a side-sectional view of the self-contained airshock assembly 100, in accordance with one embodiment. In one embodiment, compressor assembly 105 includes an air compressor 108, fluid flow path 281 (to provide a fluid pathway between the compressor assembly 105 and the airshock 204), at least one active or semi-active solenoid integrated with orifice 282 located within (and used to control the flow of fluid via) fluid flow path 281, and sensor package 93 containing one or more sensors and electrical components. In one embodiment, the at least one solenoid is a deflate solenoid. In one embodiment, compressor assembly 105 optionally includes power and ground cables 315 and canbus/ECU cable 320.

In one embodiment, air compressor 108 utilizes brushless DC motor technology (e.g., scroll compressor, rotary vane compressor, or the like. In one embodiment, a brushless DC motor is quieter and more efficient that a piston driven air compressor. In one embodiment, for example, the air compressor 108 has a target flow and pressure to fill a 300 cu in airspring from 50 psi (an example of a resting pressure for a parked vehicle) to 80 psi (an example of an active pressure for an operating vehicle) in under 6 seconds. Although a number of values are provided, in one embodiment, the values and numbers are different.

In one embodiment, orifice 282 includes at least one active or semi-active solenoid and is located within (and used to control the flow of fluid via) fluid flow path 281. In other words, orifice 282 (with the active or semi-active solenoid) is used to control the flow of fluid via fluid flow path 281 that allows gas or fluid to be pumped into airspring 204 via air compressor 108. Similarly, orifice 282 provides an active or semi-active solenoid that is used to release the gas or fluid out of airspring 204. Compressor assembly 105 is shown and described in further detail in FIG. 2C and the discussion associated therewith.

In one embodiment, air compressor 108 directly fills the airspring 204. As such, there is no reservoir or tank that is standing by to inflate airspring 204. Since there is no air tank, there are no inflate solenoids. In one embodiment, sensor package 93 is indicative of one or more sensors such as, air pressure sensors, ride height sensors, and the like. In one embodiment, the location of the sensor package 93 can be in different locations. For example, in one embodiment, the air pressure sensor can be integrated with an airsleeve cap. In one embodiment, a ride height sensor is integrated with the piston rod 208 (of FIGS. 2A and 2B).

In one embodiment, the self-contained airshock assembly 100 uses both air pressure sensors and ride height sensors to ensure the vehicle is at the proper ride height while also having an appropriate amount of air pressure. This overcomes a problem of just using a ride height sensor which can result in significantly different air pressures in different airsprings.

For example, when parked on even ground the left front and right rear self-contained airshock assemblies are at 100 PSI, in contrast, the right front and left rear self-contained airshock assemblies are at 50 PSI. In one embodiment, a ride height sensors alone would indicate that the vehicle is at the appropriate ride height, however, the differences in the air pressures could cause a dangerous driving/handling situation. By monitoring both air pressure and ride height, such an out of balance scenario is avoided in the self-contained airshock assembly 100.

In one embodiment, the ride height sensor is a combination of a visually identifiable mark 73 (e.g., a barcode, microlaser etching, other symbol, or the like) on the piston rod 208 and an optical sensor 6 coupled with the shock body. In one embodiment, the ride height sensor is a linear hull effect sensor. In one embodiment, the ride height sensor is a time-of-flight optical sensor (e.g., LIDAR, or the like). In one embodiment, the ride height sensor is a non-contact optical sensor (e.g., an IR position sensor, or the like) that measures a length such as, but not limited to, the distance between the top and bottom of the airspring piston (or two or more different portions of the airshock assembly 100, shock absorber 202, and/or airspring 204) to determine the ride height of the airshock assembly 100. In one embodiment, the ride height sensor is a magnetostrictive sensor coupled with (integrated with, incorporated with, or the like) in the shock shaft (in one embodiment, the shock shaft is made or non-ferrous material such as stainless steel, aluminum or titanium) with a magnet coupled with (integrated with, incorporated with, or the like) a seal head (or other location on the shock body) or an optical position sensor.

In one embodiment, one or more of the ride height sensor and/or other sensitive components are located within the airspring housing and as such, are protected from the elements. In one embodiment, by integrating the sensitive components within the housing of self-contained airshock assembly 100, the sensitive components are protected from wear and tear, damage, and the like that can be caused by vehicle suspension movement, environmental factors, e.g., dirt, mud, rocks, weather, water, and the like.

Figure 3A:
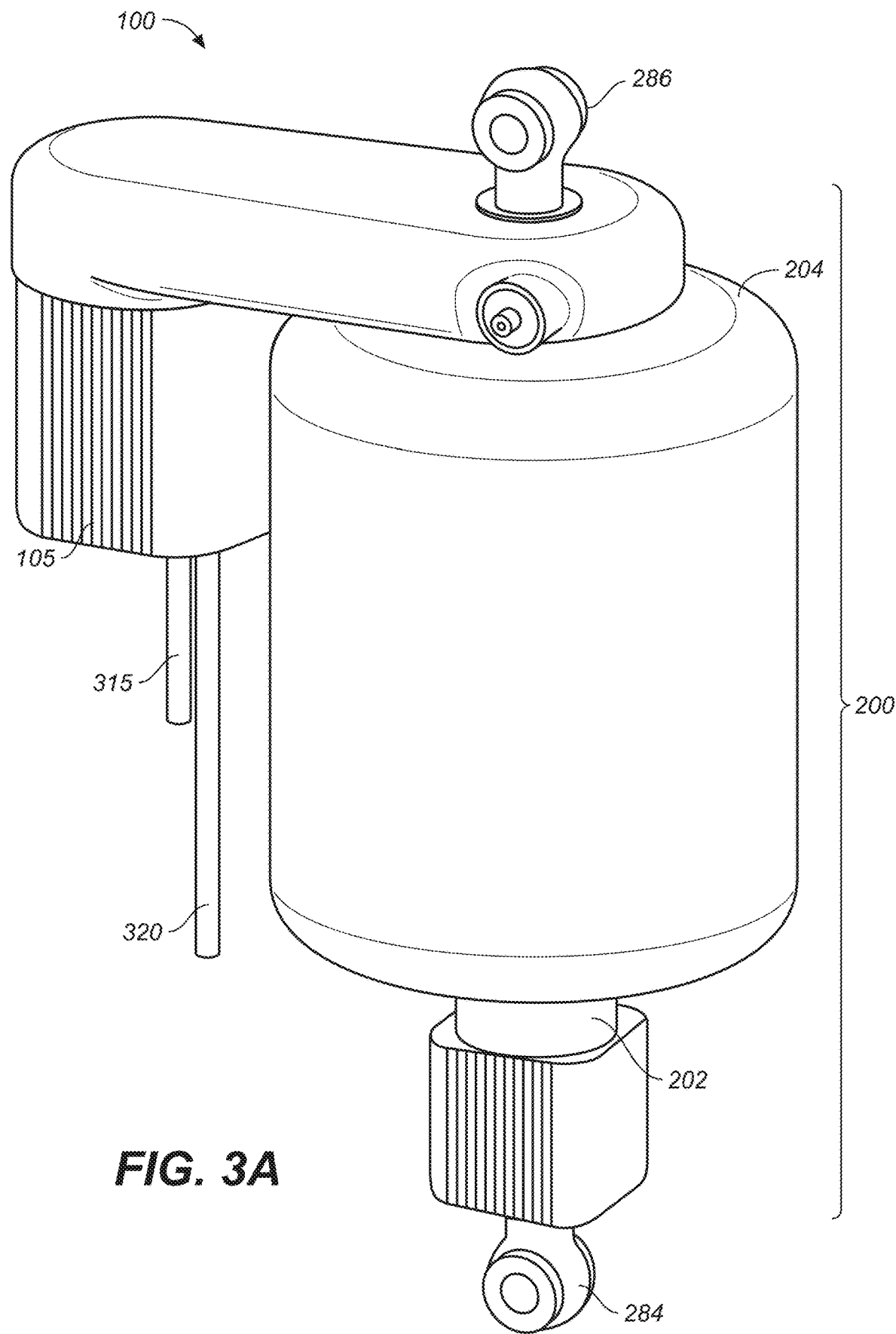
FIG. 3A is a perspective view of a self-contained airshock assembly with a wiring assembly, in accordance with an embodiment.
Figure 3B:
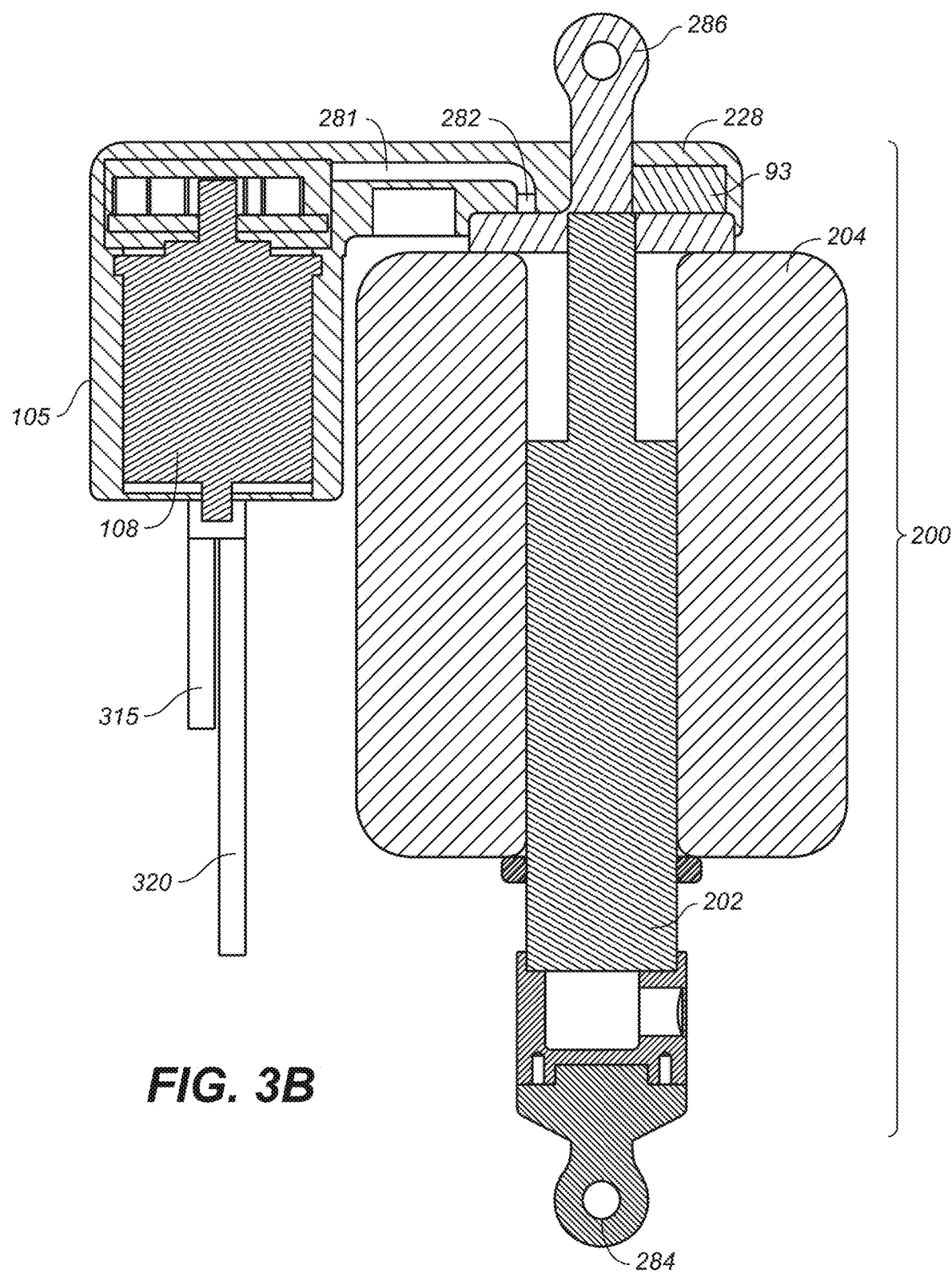
FIG. 3B is a side-sectional view of the self-contained airshock assembly with a wiring assembly as shown in FIG. 3A, in accordance with an embodiment.

With reference now to FIG. 3A, a perspective view of a self-contained airshock assembly 100 having a wiring assembly is shown in accordance with an embodiment. FIG. 3B is a side-sectional view of the self-contained airshock assembly 100 having a wiring assembly as shown in FIG. 3A, in accordance with an embodiment. Other than the power and ground cables 315 and canbus/ECU cable 320, the components and operation of FIGS. 3A and 3B are similar to those of FIGS. 1A-2C and, as such, the discussion of those components is incorporated by reference in their entirety.

In one embodiment, the ECU is integrated into the airsleeve cap 228 (e.g., as a part of sensor package 93) and the integrated ECU is powered by power and ground cables 315. In one embodiment, the ECU also includes canbus/ECU cable 320 to provide communications capabilities. In one embodiment, the ECU can include both wireless and wired communications capabilities.

In one embodiment, if the shock assembly is an active shock that includes one or more active valves, the power and ground cables 315 and/or canbus/ECU cable 320 could be part of the wiring already present in the active shock for power and/or communications.

In one embodiment, ECU of sensor package 93 will also receive other sensor input such as, but not limited to, location information (e.g., GPS input, navigation input, terrain information, etc.), passenger load information (e.g., additional weight input, occupied seat sensors, etc.), vehicle load information (e.g., towing, weigh loaded in or on vehicle such as cargo, etc.), speed (from the vehicle ECU), accelerometer information (from vehicle sensors, a user's mobile device, etc.), inclinometers, sag sensors, and/or other sensor measurements. This additional information would be used by the ECU to provide the appropriate air pressure and ride height settings to a single self-contained airshock assembly 100 or a plurality of communicatively coupled self-contained airshock assemblies.

Figure 3C:
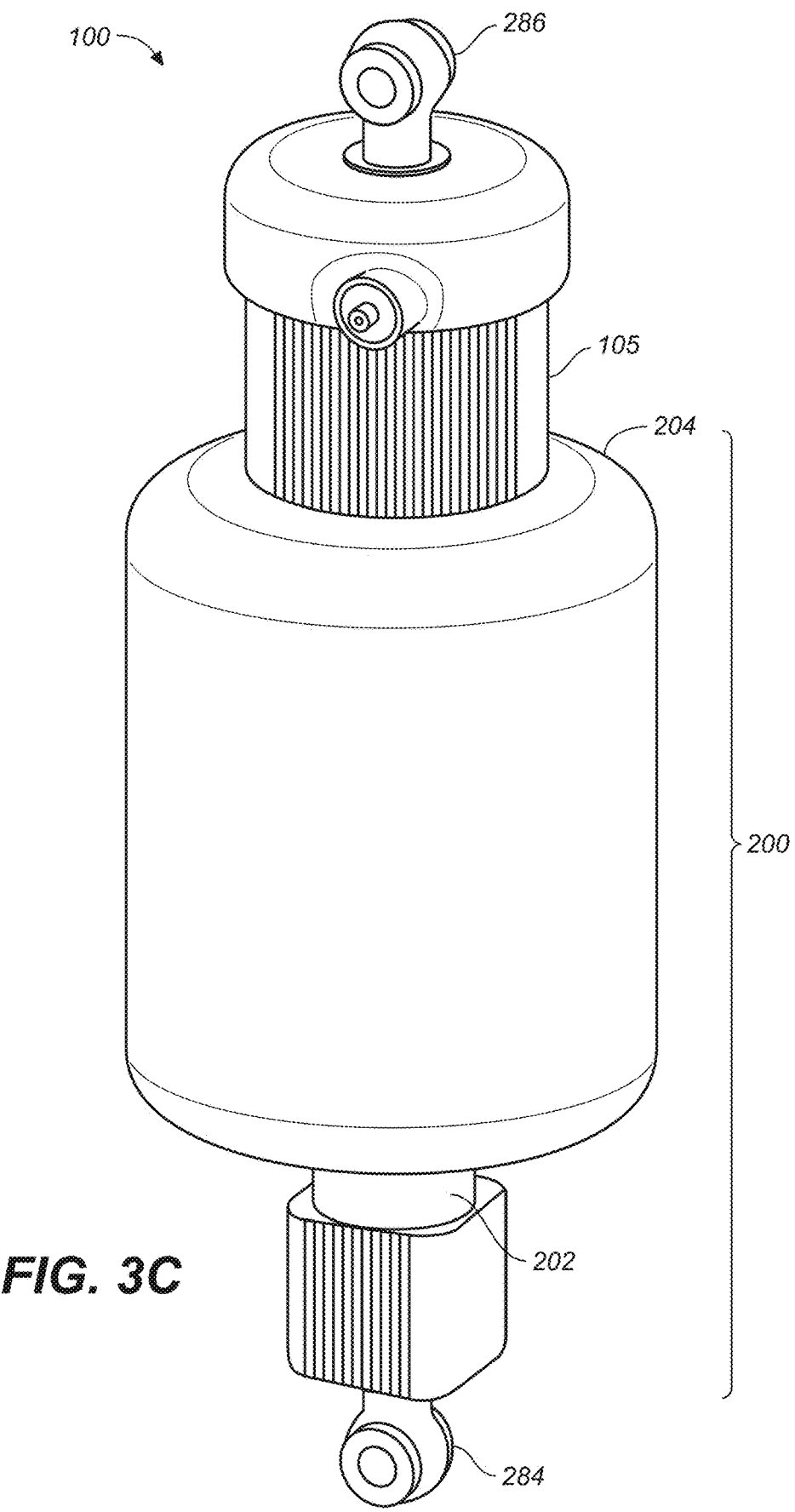
FIG. 3C is a perspective view of a self-contained airshock assembly with an axial mounted compressor, in accordance with an embodiment.
Figure 3D:
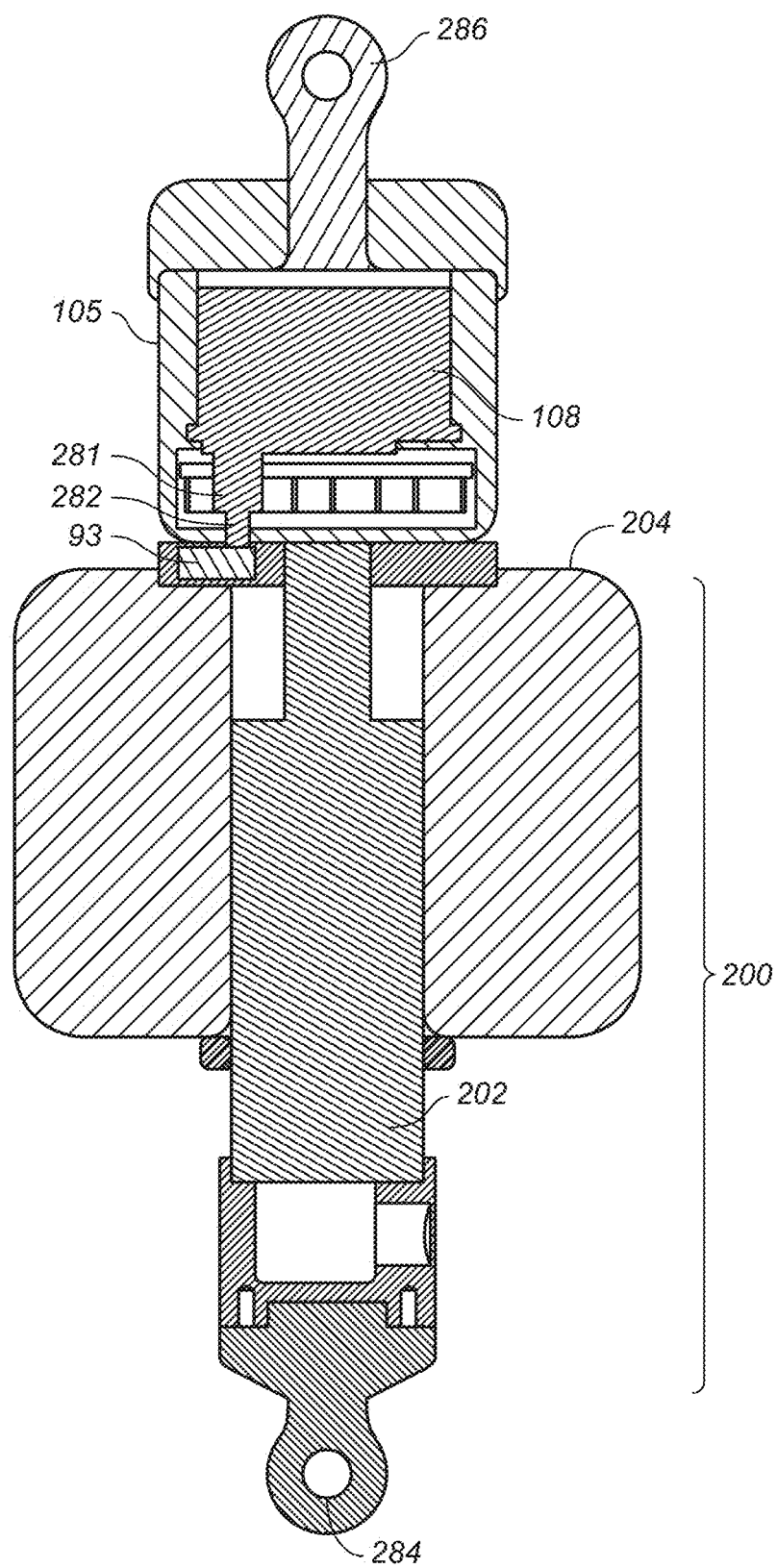
FIG. 3D is a side-sectional view of the self-contained airshock assembly with an axial mounted compressor as shown in FIG. 3C, in accordance with an embodiment.

Referring now to FIG. 3C, a perspective view of a self-contained airshock assembly 100 with an axial mounted compressor assembly 105 is shown in accordance with an embodiment. FIG. 3D is a side-sectional view of the self-contained airshock assembly 100 with an axial mounted compressor assembly 105 as shown in FIG. 3C, in accordance with an embodiment. Other than the relocation of the compressor assembly 105 being mounted axially along self-contained airshock assembly 100, the components and operation of FIGS. 3C and 3D are similar to those of FIGS. 1A-2C and, as such, the discussion of those components is incorporated by reference in their entirety.

In one embodiment, by axially mounting the compressor assembly 105 about the airshock 200, the self-contained airshock assembly 100 will be able to fit into an even smaller diameter environment. This type of orientation may be valuable in smaller vehicles, tighter configurations, or the like.

In one embodiment, self-contained airshock assembly 100 can be manual and/or automatic in its operation. In one embodiment, the manual operation includes a signal received by self-contained airshock assembly 100 from a computing device. For example, the user would have an app on a smart phone (or other computing device) and would control self-contained airshock assembly 100 via the app, or self-contained airshock assembly 100 would receive input from the modular active damping control system 700 such as shown in FIG. 7.

In one embodiment, self-contained airshock assembly 100 can include one or more active and/or semi-active valves corresponding to any number of solenoids or orifices to control any number of fluid flow paths. The operation of active valves is described in further detail in FIGS. 4-6.

In one embodiment, self-contained airshock assembly 100 may be operated remotely by a switch or potentiometer located in the cockpit of a vehicle, may be operated in response to input from a microprocessor (e.g. calculating desired settings based on vehicle sensor data), or any suitable combination of activation means. In like manner, a controller for self-contained airshock assembly 100 may be cockpit mounted and may be manually adjustable or microprocessor controlled or both or selectively either.

In one embodiment, it may be desirable to increase the damping rate or effective stiffness of self-contained airshock assembly 100 when a vehicle traverses from off-road to on highway use or vice-versa. Off-road use often requires a high degree of compliance to absorb shock imparted by the widely varying terrain. On highway use, self-contained airshock assembly 100 will often require a more rigid damper setting to allow a user to maintain control of a vehicle at higher speeds. This may be especially true during cornering or braking. Thus, in one embodiment, a vehicle will have at least one self-contained airshock assembly 100 at each wheel.

However, because of the modularity of self-contained airshock assembly 100. In one embodiment, the self-contained airshock assembly 100 could be added to a vehicle as a pair (e.g., both rear wheels or both front wheels). As such, the user could break up the purchase to provide an amount of time to buy and install, save, and then buy and install again.

In one embodiment, each self-contained airshock assembly 100 may be electrically connected with a linear switch (such as that which operates an automotive brake light) that is activated in conjunction with the vehicle brake. When the brake is moved beyond a certain distance, corresponding usually to harder braking and hence potential for vehicle nosedive, the electric switch connects a power supply to a motive force generator that causes self-contained airshock assembly 100 to increase the air pressure therein.

As such, the self-contained airshock assembly 100 will become more rigid during hard braking. Other mechanisms may be used to trigger a pressure change in self-contained airshock assembly 100 such as accelerometers (e.g. tri-axial) for sensing pitch and roll of the vehicle, a vehicle steering column includes right turn and left turn limit switches, or as stated herein, self-contained airshock assembly 100 can operate automatically based upon one or more driving conditions.

In general, the self-contained airshock assembly 100 can be used as a suspension component on an automobile, motorcycle, bicycle, electric bicycle, ATV, snow machine, side by side, snow machine, personal watercraft, and the like. Moreover, self-contained airshock assembly 100 can be used in conditions including, on-road, off-road, trail, and the like.

Although the self-contained airshock assembly 100 has been described for use with a vehicle suspension system, self-contained airshock assembly 100 is also useful in other force dampening applications such as: vehicle engine mounts, aircraft landing gear, vehicle crash resistance, motion dampening of building structures, etc.

Active Valve

Figure 4:
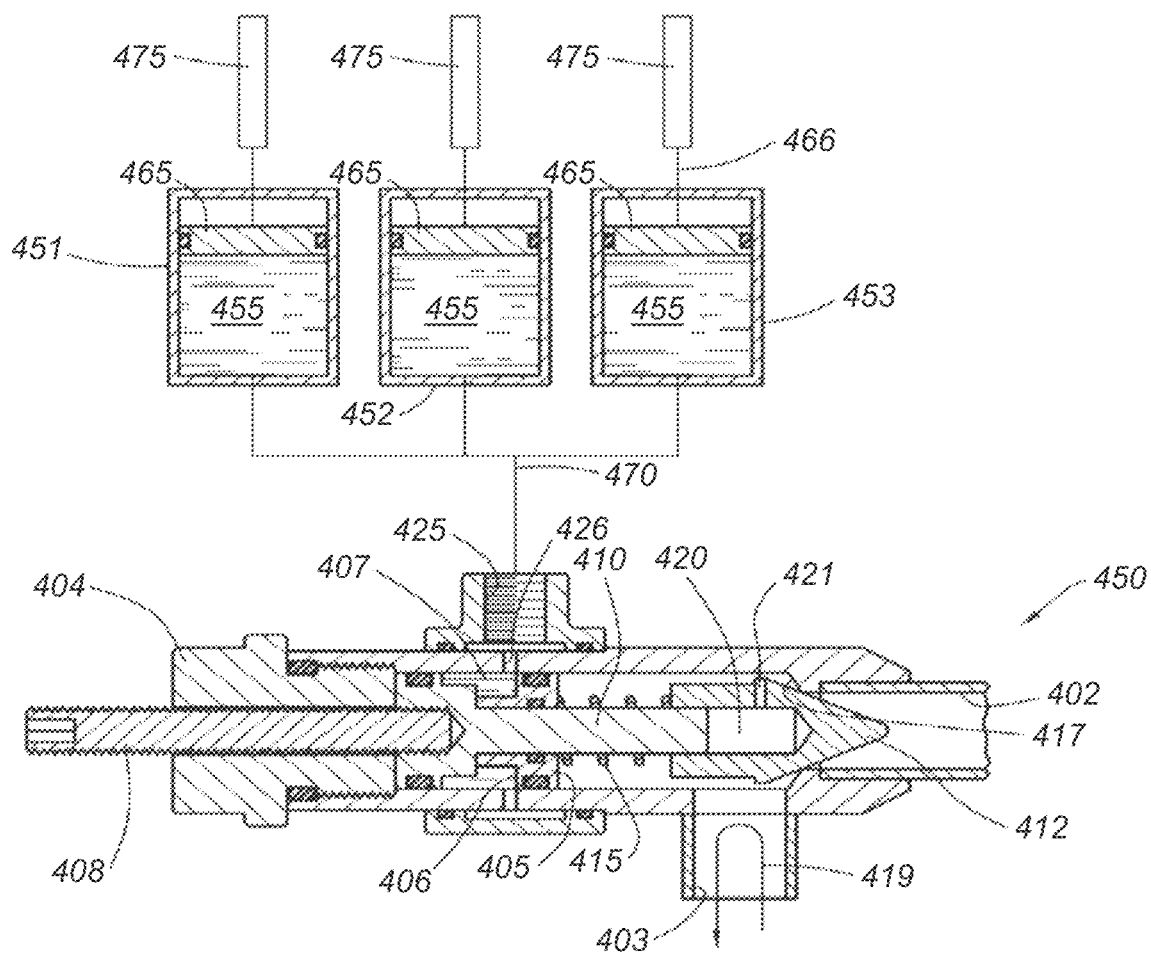
FIG. 4 is a schematic view of an active valve and a plurality of valve operating cylinders in selective communication with an annular piston surface of the active valve, in accordance with an embodiment.

Referring now to FIG. 4, a schematic view of an active valve 450 is shown in accordance with an embodiment. In one embodiment, the active valve(s) are solenoid operated, hydraulically operated, pneumatically operated, or operated by any other suitable motive mechanism. For purposes of clarity, the following active valve discussion will refer to the active valve 450. However, it should be appreciated that the active valve discussion can be applied to any active valves or solenoids in self-contained airshock assembly 100.

Although FIG. 4 shows the active valve 450 in a closed position (e.g. during a rebound stroke of the damper), the following discussion also includes the opening of active valve 450. Active valve 450 includes a valve body 404 housing a movable piston 405 which is sealed within the body. The piston 405 includes a sealed chamber 407 adjacent an annular piston surface 406 at a first end thereof. The chamber 407 and annular piston surface 406 are in fluid communication with a port 425 accessed via opening 426. Two additional fluid communication points are provided in the body including orifice 402 and orifice 403 for fluid passing through the active valve 450.

Extending from a first end of the piston 405 is a shaft 410 having a cone shaped member 412 (other shapes such as spherical or flat, with corresponding seats, will also work suitably well) disposed on an end thereof. The cone shaped member 412 is telescopically mounted relative to, and movable on, the shaft 410 and is biased toward an extended position due to a spring 415 coaxially mounted on the shaft 410 between the cone shaped member 412 and the piston 405. Due to the spring biasing, the cone shaped member 412 normally seats itself against a valve seat 417 formed in an interior of the valve body 404.

As shown, the cone shaped member 412 is seated against valve seat 417 due to the force of the spring 415 and absent an opposite force from fluid entering the active valve 450 along orifice 402. As cone shaped member 412 telescopes out, a gap 420 is formed between the end of the shaft 410 and an interior of cone shaped member 412. A vent 421 is provided to relieve any pressure formed in the gap. With a fluid path through the active valve 450 (from 403 to 402) closed, fluid communication is substantially shut off from the rebound side of the cylinder into the valve body (and hence to the compression side) and its "dead-end" path is shown by arrow 419.

In one embodiment, there is a manual pre-load adjustment on the spring 415 permitting a user to hand-load or un-load the spring using a threaded member 408 that transmits motion of the piston 405 towards and away from the conical member, thereby changing the compression on the spring 415.

Also shown in FIG. 4 is a plurality of valve operating cylinders 451, 452, 453. In one embodiment, the cylinders each include a predetermined volume of fluid 455 that is selectively movable in and out of each cylindrical body through the action of a separate corresponding piston 465 and rod 466 for each cylindrical body. A fluid path 470 runs between each cylinder and port 425 of the valve body where annular piston surface 406 is exposed to the fluid.

Because each cylinder has a specific volume of substantially incompressible fluid and because the volume of the sealed chamber 407 adjacent the annular piston surface 406 is known, the fluid contents of each cylinder can be used, individually, sequentially or simultaneously to move the piston a specific distance, thereby effecting the damping characteristics of the system in a relatively predetermined and precise way.

While the cylinders 451-453 can be operated in any fashion, in the embodiment shown each piston 465 and rod 466 is individually operated by a solenoid 475 and each solenoid, in turn, is operable from a remote location of the vehicle, like a cab of a motor vehicle or even the handlebar area of a motorcycle, quad, bicycle, e-bike, snowmobile, or the like.

In one embodiment, electrical power to the solenoids 475 is available from an existing power source of a vehicle (such as the battery) or is supplied from its own source, such as an integrated battery. Because the cylinders may be operated by battery or other electric power or even manually (e.g. by syringe type plunger), there is no requirement that a so-equipped suspension rely on any pressurized vehicle hydraulic system (e.g. steering, brakes) for operation.

In one embodiment, e.g., when active valve 450 is in the damping-open position, fluid flow through orifice 402 provides adequate force on the cone shaped member 412 to urge it backwards, at least partially loading the spring 415 and creating a fluid flow path from the orifice 402 into and through orifice 403.

The characteristics of the spring 415 are typically chosen to permit active valve 450 to open at a predetermined pressure, with a predetermined amount of control pressure applied to port 425. For a given spring 415, higher control pressure at port 425 will result in higher pressure required to open the active valve 450 and correspondingly higher damping resistance in orifice 402. In one embodiment, the control pressure at port 425 is raised high enough to effectively "lock" the active valve closed resulting in a substantially rigid compression damper (particularly true when a solid damping piston is also used).

In one embodiment, the valve is open in both directions when the cone shaped member 412 is "topped out" against valve body 404. In another embodiment however, when the piston 405 is abutted or "topped out" against valve body 404 the spring 415 and relative dimensions of the active valve 450 still allow for the cone shaped member 412 to engage the valve seat 417 thereby closing the valve. In such embodiment backflow from the rebound side to the compression side is always substantially closed and cracking pressure from flow along orifice 402 is determined by the pre-compression in the spring 415. In such embodiment, additional fluid pressure may be added to the inlet through port 425 to increase the cracking pressure for flow along orifice 402 and thereby increase compression damping. It is generally noteworthy that while the descriptions herein often relate to compression damping and rebound shut off, some or all of the channels (or channel) on a given suspension unit may be configured to allow rebound damping and shut off or impede compression damping.

While the examples illustrated relate to manual operation and automated operation based upon specific parameters, in various embodiments, active valve 450 can be remotely-operated and can be used in a variety of ways with many different driving and road variables and/or utilized at any point during use of a vehicle. In one example, active valve 450 is controlled based upon vehicle speed in conjunction with the angular location of the vehicle's steering wheel. In this manner, by sensing the steering wheel turn severity (angle of rotation and rotational velocity), additional damping (by adjusting the corresponding size of the opening of orifice 402 by causing cone shaped member 412 to open, close, or partially close orifice 402) can be applied to one shock absorber or one set of vehicle shock absorbers on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 450 (and corresponding change to the working size of the opening of orifice 402 by causing cone shaped member 412 to open, close, or partially close orifice 402) in response thereto. In another example, active valve 450 is controlled at least in part by a pressure transducer measuring pressure in a vehicle tire and adding damping characteristics to some or all of the wheels (by adjusting the working size of the opening of orifice 402 by causing cone shaped member 412 to open, close, or partially close orifice 402) in the event of, for example, an increased or decreased pressure reading.

In one embodiment, active valve 450 is controlled in response to vehicle changes in motion (e.g., acceleration, deceleration, etc.). In still another example, a parameter might include a gyroscopic mechanism that monitors vehicle trajectory and identifies a "spin-out" or other loss of control condition and adds and/or reduces damping to some or all of the vehicle's dampers (by adjusting the working size of the opening of orifice 402 by causing cone shaped member 412 to open, close, or partially close orifice 402 chambers) in the event of a loss of control to help the operator of the vehicle to regain control.

For example, active valve 450, when open, permits a first flow rate of the working fluid through orifice 402. In contrast, when active valve 450 is partially closed, a second flow rate of the working fluid though orifice 402 occurs. The second flow rate is less than the first flow rate but greater than no flow rate. When active valve 450 is completely closed, the flow rate of the working fluid though orifice 402 is statistically zero.

In one embodiment, instead of (or in addition to) restricting the flow through orifice 402, active valve 450 can vary a flow rate through an inlet or outlet passage within the active valve 450, itself. See, as an example, the active valve of FIGS. 2-4 of U.S. Pat. No. 9,353,818 which is incorporated by reference herein, in its entirety, as further example of different types of "active" or "active" valves). Thus, the active valve 450, can be used to meter the working fluid flow (e.g., control the rate of working fluid flow) with/or without adjusting the flow rate through orifice 402.

Due to the active valve 450 arrangement, a relatively small solenoid (using relatively low amounts of power) can generate relatively large damping forces. Furthermore, due to incompressible fluid inside the active valve damper 38, damping occurs as the distance between cone shaped member 412 and orifice 402 is reduced. The result is a controllable damping rate. Certain active valve features are described and shown in U.S. Pat. Nos. 9,120,362; 8,627,932; 8,857,580; 9,033,122; and 9,239,090 which are incorporated herein, in their entirety, by reference.

It should be appreciated that when the valve body 404 rotates in a reverse direction than that described above and herein, the cone shaped member 412 moves away from orifice 402 providing at least a partially opened fluid path.

Figure 5:
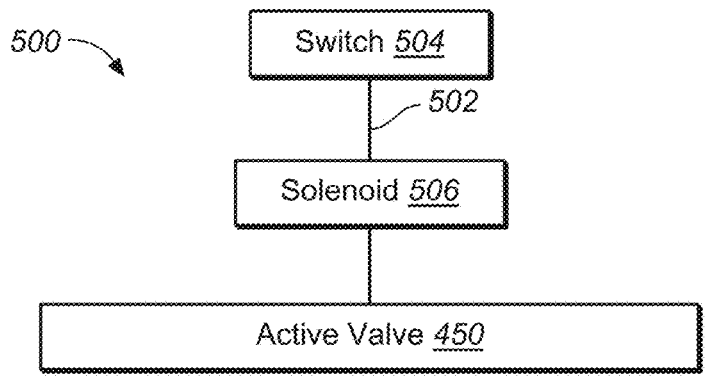
FIG. 5 is a flow diagram showing a control arrangement for an active valve, in accordance with an embodiment.

FIG. 5 is a flow diagram of a control arrangement 500 for a remotely-operated active valve 450. As illustrated, a signal line 502 runs from a switch 504 to a solenoid 506. Thereafter, the solenoid 506 converts electrical energy into mechanical movement and rotates valve body 404 within active valve 450, In one embodiment, the rotation of valve body 404 causes an indexing ring consisting of two opposing, outwardly spring-biased balls to rotate among indentions formed on an inside diameter of a lock ring.

As the valve body 404 rotates, cone shaped member 412 at an opposite end of the valve is advanced or withdrawn from an opening in orifice 402. For example, the valve body 404 is rotationally engaged with the cone shaped member 412. A male hex member extends from an end of the valve body 404 into a female hex profile bore formed in the cone shaped member 412. Such engagement transmits rotation from the valve body 404 to the cone shaped member 412 while allowing axial displacement of the cone shaped member 412 relative to the valve body 404. Therefore, while the body does not axially move upon rotation, the threaded cone shaped member 412 interacts with mating threads formed on an inside diameter of the bore to transmit axial motion, resulting from rotation and based on the pitch of the threads, of the cone shaped member 412 towards or away from an orifice 402, between a closed position, a partially open position, and a fully or completely open position.

Adjusting the opening of orifice 402 modifies the flowrate of the fluid through active valve 450 thereby varying the stiffness of a corresponding active valve damper 38. While FIG. 5 is simplified and involves control of a single active valve 450, it will be understood that any number of active valves corresponding to any number of fluid channels (e.g., bypass channels, external reservoir channels, bottom out channels, etc.) for a corresponding number of vehicle suspension dampers could be used alone or in combination. That is, one or more active valves could be operated simultaneously or separately depending upon needs in a vehicular suspension system.

For example, a suspension damper could have one, a combination of, or each of an active valve(s). The active valve(s) could be used for fluid flow path control, for bottom out control, for an internal bypass, for an external bypass, for a fluid conduit to the external reservoir 125, etc. In other words, anywhere there is a fluid flow path within active valve damper 38, an active valve could be used. Moreover, the active valve could be alone or used in combination with other active (semi-active, or passive) valves at other fluid flow paths to automate one or more of the damping performance characteristics of the damping assembly. Moreover, additional switches could permit individual operation of separate active bottom out valves.

In addition to, or in lieu of, the simple, switch-operated remote arrangement of FIG. 5, the remotely-operable active valve 450 can be operated automatically based upon one or more driving conditions, and/or automatically or manually utilized at any point during use of a vehicle.

Figure 6:
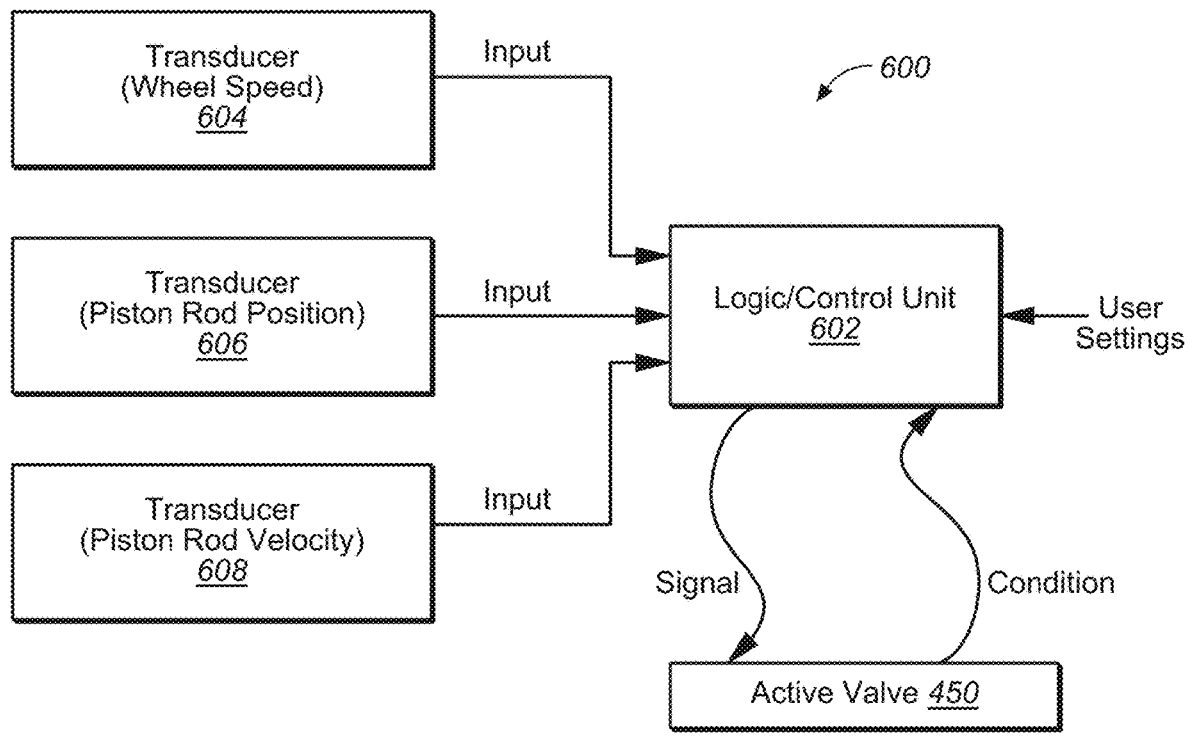
FIG. 6 is a flow diagram of a control system based upon any or all of vehicle speed, damper rod speed, and damper rod position, in accordance with an embodiment.

FIG. 6 is a flow diagram of a control system 600 based upon any or all of vehicle speed, damper rod speed, and damper rod position. One embodiment of the arrangement of control system 600 is designed to automatically increase damping in a shock absorber in the event a damper rod reaches a certain velocity in its travel towards the bottom end of a damper at a predetermined speed of the vehicle.

In one embodiment, the control system 600 adds damping (and control) in the event of rapid operation (e.g. high rod velocity) of the active valve damper 38 to avoid a bottoming out of the damper rod as well as a loss of control that can accompany rapid compression of a shock absorber with a relative long amount of travel. In one embodiment, the control system 600 adds damping (e.g., adjusts the size of the opening of orifice 402 by causing cone shaped member 412 to open, close, or partially close orifice 402) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 6 illustrates, for example, a control system 600 including three variables: wheel speed, corresponding to the speed of a vehicle component (measured by wheel speed transducer 604), piston rod position (measured by piston rod position transducer 606), and piston rod velocity (measured by piston rod velocity transducer 608). Any or all of the variables shown may be considered by logic unit 602 in controlling the solenoids or other motive sources coupled to active valve 450 for changing the working size of the opening of orifice 402 by causing cone shaped member 412 to open, close, or partially close orifice 402. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension damper or other connected suspension element such as the tire, wheel, or axle assembly. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet.

The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper measure piston rod velocity (piston rod velocity transducer 608), and piston rod position (piston rod position transducer 606), a separate wheel speed transducer 604 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, the logic unit 602 with user-definable settings receives inputs from piston rod position transducer 606, piston rod velocity transducer 608, as well as wheel speed transducer 604. Logic unit 602 is user-programmable and, depending on the needs of the operator, logic unit 602 records the variables and, then, if certain criteria are met, logic unit 602 sends its own signal to active valve 450 (e.g., the logic unit 602 is an activation signal provider) to cause active valve 450 to move into the desired state (e.g., adjust the flow rate by adjusting the distance between cone shaped member 412 and orifice 402). Thereafter, the condition, state, or position of active valve 450 is relayed back to logic unit 602 via an active valve monitor or the like.

In one embodiment, logic unit 602 shown in FIG. 6 assumes a single active valve 450 corresponding to orifice 402 of active valve damper 38, but logic unit 602 is usable with any number of active valves or groups of active valves corresponding to any number of orifices, or groups of orifices. For instance, the suspension dampers on one side of the vehicle can be acted upon while the vehicles other suspension dampers remain unaffected.

Referring now to FIG. 7, a block diagram of a modular active damping control system 700 is shown in accordance with an embodiment. Modular active damping control system 700 includes a plurality of self-contained airshock assemblies (hereinafter self-contained airshock assemblies 721-724) and a control system 711.

In one embodiment, there is at least one self-contained airshock assembly 100, located at each of a vehicle wheel suspension location. For example, self-contained airshock assembly 721 at the left front, self-contained airshock assembly 722 at the right front, self-contained airshock assembly 723 at the left rear, and self-contained airshock assembly 724 at the right rear.

Although active damping control system 700 is shown as interacting with four self-contained airshock assemblies 721-724 such as would be likely found in a four wheeled vehicle suspension configuration, it should be appreciated that the technology is well suited for application in other vehicles with different suspension configurations. The different configurations can include two wheel suspension configuration like that of a motorcycle; a one, two or three "wheel" suspension configuration like that of a snowmobile, trike, or boat, a plurality of self-contained airshock assemblies at each of the self-contained airshock assembly 100 suspension locations such as found in off-road vehicles, UTV, powersports, heavy trucking, RV, agriculture, maritime, and the like. The use of a single self-contained airshock assembly 100 in each of a four suspension location configuration as shown herein is provided merely as one example.

In one embodiment, control system 711 includes electronic damping control (EDC) 710, vehicle CAN bus 708, CAN Bus 731 to an optional human machine interface (HMI) 714 (or graphical user interface (GUI)), warning 713, and battery 712. It should be appreciated that in an embodiment, one or more components shown within control system 711 would be located outside of control system 711, and similarly additional components would be located within control system 711.

In one embodiment, EDC 710 includes a processor. In operation, both compression and rebound EDC 710 will maximize suspension control. In one embodiment, EDC 710 will control each self-contained airshock assembly 100 located at each vehicle wheel suspension location, automatically tune the self-contained airshock assembly 100, automatically monitor the self-contained airshock assembly 100 and determine when a change has been made to one or more of the self-contained airshock assemblies, and automatically re-tune self-contained airshock assembly 100 based on the change to one or more of the plurality of self-contained airshock assemblies.

For example, in one embodiment EDC 710 is able to modify the compression and/or rebound settings of the shock absorber 202 of the self-contained airshock assembly. In one embodiment, EDC 710 will modify the compression and/or rebound settings of the shock absorber 202 depending upon terrain, ride type, and the like. In one embodiment, EDC 710 will modify the compression and/or rebound settings of the shock absorber 202 in real time such as based on actual performance, based on actual location (such as GPS information) or the like. In one embodiment, EDC 710 will modify the compression and/or rebound settings of the shock absorber 202 as part of a program or application operating on the ECU, user's mobile device, and the like.

In one embodiment EDC 710 is able to modify the pressure settings of airspring 204 of the self-contained airshock assembly to adjust compression, rebound, load capacity, and/or ride height. In one embodiment, EDC 710 will modify the pressure settings of airspring 204 depending upon terrain, ride type, and the like. In one embodiment, EDC 710 will modify the pressure settings of airspring 204 in real time such as based on actual performance, based on actual location (such as GPS information) or the like. In one embodiment, EDC 710 will modify the pressure settings of airspring 204 as part of a program or application operating on the ECU, user's mobile device, and the like.

In one embodiment, EDC 710 is able to modify the compression and/or rebound settings of the shock absorber 202 as well as the pressure settings of airspring 204 to provide full adjustment capabilities for the self-contained airshock assembly 100. In one embodiment, when the EDC 710 is able to modify/control the compression and/or rebound settings of the shock absorber 202 as well as the pressure settings of airspring 204, the EDC 710 will not only be able to control and modify the different inputs and settings of each of shock absorber 202 and airspring 204, but also determine, evaluate, and adjust those modifications based on the related interactions that occur between active control of the dampers and the control of the spring when one or both of the components are adjusted. For example, a higher bag pressure of airspring 204 can result in effectively higher spring rates (and the like) which will change the baseline level of damping required by shock absorber 202 (e.g., stiffer/softer springs, stiffer/softer settings, etc.). Similarly, a lower bag pressure of airspring 204 can result in effectively lower spring rate (and the like) which will change the baseline level of damping required by shock absorber 202 (e.g., stiffer/softer springs, stiffer/softer settings, etc.).

In one embodiment, EDC 710 will use GPS or other location based data to determine the type of terrain inputs to expect and adjust filtering and other sensor signal processing variables to optimize system performance based on that information.

In one embodiment, there is no need for HMI/GUI 714 within the modular active damping control system 700. Instead, the suspension configuration will be identified by the warning 713 or lack thereof. In another embodiment, there may be suspension configuration switches instead of an HMI/GUI 714.

In one embodiment, optional HMI/GUI 714 is a GUI that presents a self-contained airshock assembly 100 configuration and operational information about the self-contained airshock assembly 100 configuration, e.g., vehicle suspension settings, in a user interactive format, such as on a display located proximal to a vehicle operator.

In one embodiment, optional HMI/GUI 714 is configured to present vehicle suspension setting information in a user interactive format on a display, where the HMI will have a touch input capability to receive an input from a user via a user interaction with the HMI. HMI is also programmable to present self-contained airshock assembly 100 configuration information, rebound configuration information and/or suspension setting information in a user interactive format on a display.

In one embodiment, the vehicle suspension setting information includes a plurality of different vehicle suspension mode configurations and an identification of which configuration mode is currently active on the vehicle suspension. In one embodiment, the plurality of different vehicle suspension mode configurations is user selectable.

If one or more of the components of self-contained airshock assemblies 721-724 are automatically adjustable, in one embodiment, control system 711 will automatically adjust one or more of the plurality of self-contained airshock assemblies based on external conditions such as, weather, terrain, ground type (e.g., asphalt, concrete, dirt, gravel, sand, water, rock, snow, etc.), and the like.

In one embodiment, control system 711 will automatically adjust one or more of the plurality of self-contained airshock assemblies 721-724 based on one or more sensor inputs received from sensors such as an inertial gyroscope, an accelerometer, a magnetometer, a magnetostrictive sensor embedded in the shock shaft, a steering wheel turning sensor, a single or multi spectrum camera, a ride height sensor, a sag sensor, and the like.

In one embodiment, the active damping control system 700 characteristics can be set at the factory, manually adjustable by a user, or automatically adjustable by a computing device using environmental inputs and the like. For example, the suspension characteristics for the self-contained airshock assemblies 721-724 are manually or automatically adjustable based on user preference, speed, maneuvering, ride type, or the like.

In one embodiment, the adjustable characteristics for the self-contained airshock assemblies 721-724 are manually adjustable via a user input. For example, via user interaction with HMI/GUI 714.

In one embodiment, the adjustable characteristics for the self-contained airshock assemblies 721-724 are automatically adjusted based on external conditions, e.g., sensors detecting damper, vibration, or the like. For example, in a smooth operating environment, e.g., on a highway or smooth road, configuration adjustments may be provided by the user via HMI 714, or automatically applied by active damping control system 700, to increase firmness in the ride. That is, to provide additional hardness that would increase feedback, feel and precise handling.

In contrast, when rougher terrain is encountered, the user can select a rough terrain setting at HMI 714. In contrast, the active damping control system 700 would receive information from one or more sensors (coupled to the suspension near self-contained airshock assemblies 721-724, via the Vehicle CAN bus 708, or the like) about the rough terrain and re-tune the vehicle suspension based on to a softer setting. That is, to provide appropriate suspension control characteristics for the vehicle. In addition, the adjustment provides a softer ride that would reduce operator/passenger felt vibrations, damper, bumps, and the like thereby reducing operator fatigue and/or.

As described herein, the manual option includes a user selectable switch, icon on a touch display, or the like at the GUI or HMI, that allows a user to make a selection based on given characteristics, e.g., highway mode—for smooth terrain, —off-road mode—for rough terrain, a mixed mode for intermediate terrain, a lower ride height due to added cargo (e.g., material, passengers, etc.) and the like.

In one embodiment, the manual option is provided at the GUI or HMI. In one embodiment, the manual option may be one or more switches that allow the use to select one or more pre-defined suspension settings. For example, the pre-defined suspension settings can include, but are not limited to, ride height, stiffness, softness, highway, offroad, mixed terrain, rock climbing, racing, performance, sport, wet, and the like.

In an automated mode, active damping control system 700 automatically adjusts one or more characteristics for one or more self-contained airshock assemblies 721-724 based on one or more inputs received at the processor of EDC 710. For example, in one embodiment, the vehicle ride height, vehicle load weight, passenger sensors, steering inputs, vehicle roll, speed, and the like are detected and/or monitored via one or more sensors on or about the vehicle. Similarly, external conditions such as weather, terrain, ground type, and the like are also detected and/or monitored via the one or more sensors on or about the vehicle.

Sensors such as but not limited to, accelerometers, sway sensors, suspension changes, visual identification technology (e.g., single or multi spectrum camera's), driver input monitors, steering wheel turning sensors, and the like. For example, one embodiment uses an inertial measurement unit (IMU) to sense rough terrain. One embodiment has an attitude and heading reference system (AHRS) that provides 3D orientation integrating data coming from inertial gyroscopes, accelerometers, magnetometers, magnetostrictive sensor(s), and the like. For example, in one embodiment, the AHRS is a GPS aided Microelectromechanical systems (MEMS) based IMU and static pressure sensor.

Moreover, active damping control system 700 will be able to adjust self-contained airshock assembly 100 automatically and on the fly. For example, active damping control system 700 will set the remotely adjustable self-contained airshock assembly 100 to increase or decrease ride height, adjust for firmness, and the like.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

What is claimed is:

1. A self-contained airshock assembly comprising:
   a shock absorber;
   an airspring, said airspring axially coupled with a portion of said shock absorber, said airspring to modify a ride height of said shock absorber; and
   an air compressor assembly coupled with a portion of said shock absorber, said air compressor assembly to modify an air pressure in said airspring, said air compressor assembly directly coupled with said airspring, said self-contained airshock assembly not having a reservoir or tank to inflate said airspring, said self-contained airshock assembly not having an inflate solenoid between said airspring and said air compressor assembly, said self-contained airshock assembly not having an airline disposed external to said self-contained shock absorber assembly, said self-contained airshock assembly not having airline fittings.

2. The self-contained airshock assembly of claim 1, further comprising:
   a ride height sensor integrated with said shock absorber.

3. The self-contained airshock assembly of claim 2, wherein said ride height sensor comprises:
   a non-contact optical sensor.

4. The self-contained airshock assembly of claim 3, wherein said non-contact optical sensor comprises:
   an IR position sensor configured to measure a distance between a top and a bottom of a piston of said airspring.

5. The self-contained airshock assembly of claim 2, wherein said ride height sensor comprises:
   a visually identifiable mark on a piston rod of said shock absorber; and
   an optical sensor coupled with a body of said shock absorber.

6. The self-contained airshock assembly of claim 2, wherein said ride height sensor comprises:
   a magnetostrictive sensor embedded in a shaft of said shock absorber; and
   a magnet incorporated with a seal head of said shock absorber.

7. The self-contained airshock assembly of claim 2, further comprising:
   an air pressure sensor integrated with said airshock assembly, said air pressure sensor to monitor said air pressure in said airspring, said air pressure sensor utilized in conjunction with said ride height sensor to maintain said ride height of said airshock assembly.

8. The self-contained airshock assembly of claim 1, wherein said air compressor assembly comprises:
   an air compressor;
   a fluid flow path between said air compressor and said airspring; and
   an orifice, said orifice to control a fluid flow through said fluid flow path.

9. The self-contained airshock assembly of claim 1, further comprising:
   an electronic control unit (ECU) integrated with said airshock assembly, said ECU configured to modify one or more of a compression setting of said shock absorber, a rebound setting of said shock absorber, and an air pressure setting for said air pressure in said airspring.

10. A self-contained airshock assembly comprising:
    a shock absorber;
    an airspring, said airspring axially coupled with a portion of said shock absorber, said airspring to maintain a ride height of said shock absorber; and
    an air compressor assembly coupled with a portion of said shock absorber said air compressor assembly comprising:
       an air compressor;
       a fluid flow path between said air compressor and said airspring; and
       an orifice comprising a solenoid within said fluid flow path, said orifice to control a fluid flow through said fluid flow path, wherein said air compressor assembly modifies an air pressure in said airspring, said air compressor assembly directly coupled with said airspring, said self-contained airshock assembly not having a reservoir or tank to inflate said airspring, said self-contained airshock assembly not having an inflate solenoid between said airspring and said air compressor assembly, said self-contained airshock assembly not having an airline disposed external to said self-contained shock absorber assembly, said self-contained airshock assembly not having airline fittings.

11. The self-contained airshock assembly of claim 10, further comprising:
    a ride height sensor integrated with said self-contained airshock assembly.

12. The self-contained airshock assembly of claim 11, wherein said ride height sensor comprises:
    a non-contact optical sensor.

13. The self-contained airshock assembly of claim 12, wherein said non-contact optical sensor comprises:
    an IR position sensor configured to measure a distance between a top and a bottom of a piston of said airspring.

14. The self-contained airshock assembly of claim 11, wherein said ride height sensor comprises:

a visually identifiable mark on a piston rod of said shock absorber; and an optical sensor coupled with a body of said shock absorber.

15. The self-contained airshock assembly of claim 11, wherein said ride height sensor comprises:

a magnetostrictive sensor embedded in a shaft of said shock absorber; and a magnet incorporated with a seal head of said shock absorber.

16. The self-contained airshock assembly of claim 11, further comprising:

an air pressure sensor integrated with said self-contained airshock assembly, said air pressure sensor to monitor said air pressure in said airspring, said air pressure sensor utilized in conjunction with said ride height sensor to maintain said ride height of said self-contained airshock assembly.

17. The self-contained airshock assembly of claim 10, further comprising:

an electronic control unit (ECU) integrated with said self-contained airshock assembly, said ECU configured to modify a compression setting of said shock absorber, a rebound setting of said shock absorber, and an air pressure setting for said air pressure in said airspring.

18. The self-contained airshock assembly of claim 17, further comprising:

a real-time location determiner configured to determine a real-time location information for said self-contained airshock assembly, said real-time location determiner communicatively coupled with said ECU; and said ECU configured to modify one or more of said compression setting of said shock absorber, said rebound setting of said shock absorber, and said air pressure setting for said airspring, based on said real-time location information.

19. A self-contained airshock assembly comprising:

a shock absorber;

an airspring, said airspring axially coupled with a portion of said shock absorber, said airspring to maintain a ride height of said shock absorber;

an air compressor assembly coupled with a portion of said shock absorber said air compressor assembly comprising:

an air compressor;

a fluid flow path between said air compressor and said airspring; and an orifice comprising a solenoid within said fluid flow path, said orifice to control a fluid flow through said fluid flow path, wherein said air compressor assembly modifies an air pressure in said airspring, said air compressor assembly directly coupled with said airspring, said self-contained airshock assembly not having a reservoir or tank to inflate said airspring, said self-contained airshock assembly not having an inflate solenoid between said airspring and said air compressor assembly, said self-contained airshock assembly not having an airline disposed external to said self-contained shock absorber assembly, said self-contained airshock assembly not having airline fittings; and an electronic control unit (ECU), said ECU configured to modify a compression setting of said shock absorber, a rebound setting of said shock absorber, and an air pressure setting for said air pressure in said airspring.

20. The self-contained airshock assembly of claim 19, further comprising:

a ride height sensor integrated with said self-contained airshock assembly.

21. The self-contained airshock assembly of claim 20, further comprising:

an air pressure sensor integrated with said self-contained airshock assembly, said air pressure sensor to monitor said air pressure in said airspring, said air pressure sensor utilized in conjunction with said ride height sensor to manage said ride height of said self-contained airshock assembly.

22. The self-contained airshock assembly of claim 19, further comprising:

a real-time location determiner configured to determine a real-time location information for said self-contained airshock assembly, said real-time location determiner communicatively coupled with said ECU; and said ECU configured to modify one or more of said compression setting of said shock absorber, said rebound setting of said shock absorber, and said air pressure setting for said airspring, based on said real-time location information.

* * * * *